United States Patent [19]

Kasparian et al.

[11] Patent Number: 5,007,050
[45] Date of Patent: Apr. 9, 1991

[54] BIDIRECTIONAL DIGITAL SERIAL INTERFACE FOR COMMUNICATION DIGITAL SIGNALS INCLUDING DIGITIZED AUDIO BETWEEN MICROPROCESSOR-BASED CONTROL AND TRANSCEIVER UNITS OF TWO-WAY RADIO COMMUNICATIONS EQUIPMENT

[75] Inventors: Kaspar A. Kasparian, Raleigh; Aaron S. Rogers, Knightdale; Ming-Chyuan Hsu; John P. Fussell, both of Raleigh, all of N.C.

[73] Assignee: Teletec Corporation, Raleigh, N.C.

[21] Appl. No.: 31,003

[22] Filed: Mar. 27, 1987

[51] Int. Cl.⁵ ............................................. H04J 3/00
[52] U.S. Cl. ...................... 370/77; 370/29; 370/95.3; 370/4; 455/54; 455/88
[58] Field of Search ............ 455/14, 53, 54, 88; 375/7, 8; 370/77, 95, 29, 4

[56] References Cited

U.S. PATENT DOCUMENTS

| | | | |
|---|---|---|---|
| 2,566,651 | 11/1951 | Halstead . | |
| 4,175,215 | 11/1979 | McLaughlin | 370/62 |
| 4,267,597 | 5/1981 | Volpi et al. | 455/76 |
| 4,317,222 | 2/1982 | Bell et al. | 455/77 |
| 4,370,523 | 1/1983 | Bader . | |
| 4,390,963 | 6/1983 | Puhl et al. | 364/900 |
| 4,398,265 | 8/1983 | Puhl et al. | 364/900 |
| 4,486,624 | 12/1984 | Puhl et al. | 455/77 |
| 4,616,314 | 10/1986 | Wilson et al. | 364/208 |
| 4,637,022 | 1/1987 | Burke et al. | 455/73 |
| 4,680,787 | 7/1987 | Marry | 379/63 |
| 4,718,080 | 1/1988 | Serrano et al. | 379/63 |
| 4,742,514 | 5/1988 | Goode et al. | 370/109 |
| 4,754,450 | 6/1988 | Lynk, Jr. et al. | 370/29 |

FOREIGN PATENT DOCUMENTS 2157923A 10/1985 United Kingdom .
8603926 7/1986 World Int. Prop. O. .

OTHER PUBLICATIONS

NEC Research and Development, No. 84, Jan., 1987 pp. 85-93, Tokyo, JP Kai, et al, "Cellular Mobile Radio Equipment".
Ericsson Review, vol. 60, No. 3 1983, pp. 151-158, Stockholm, SE; C. Andren, et al "Mobile Radio System C 600".

Primary Examiner—Joseph A. Orsino
Assistant Examiner—Kinfe-Michael Negash
Attorney, Agent, or Firm—Breneman & Georges

[57] ABSTRACT

A digital serial interface system is provided for communicating digital signals including digitized audio between microprocessor-based Control and Transceiver Units of two-way radio communications equipment. The system of the invention essentially comprises three subsystems: (1) an interface in the microprocessor-based Control Unit, (2) an interface in the microprocessor-based Transceiver Unit and (3) a two-way medium for linking the two units. Various signals and audio in the Control Unit interact with a software-driven microprocessor of the Control Unit and are digitized and then translated into a serial format, organized in channel groups through a TDM (Time Division Multiplex)/PCM (Pulse Code Modulation) process and transmitted in frames through a two-way medium to the Transceiver Unit which is also microprocessor-based and incorporates a similar interface. The digital data communicated to the Transceiver Unit then undergoes a reverse process. The Interface System is duplex (bidirectional). A preferred embodiment of the digital serial interface system for two-way radio equipment includes a three channel TDM/PCM bus structure scheme, operated in a synchronous full duplex mode using the Manchester II (Biphase-L) format. Various further embodiments include: an optical fiber link medium between a Control Unit and its Transceiver Unit(s), the addition of remote takeover of programming and controls, audio enhancement of receivers during scanning, encryption/decryption systems, cloning of programs between multiple units, control of multiple transceivers through one Control Unit and other added enhancements.

29 Claims, 26 Drawing Sheets

PREFERRED EMBODIMENT

PYE SYSTEM

SYNC CHAR: EXAMPLE: HD6408
CVI CVI CV0 COMMAND CHANNEL (WORD)
CV0 CV0 CVI = DATA/STATUS CHANNEL
WHERE CV0 = BOTH HALVES OF A BIT ARE AT −V
CVI = BOTH HALVES OF A BIT ARE AT +V

LEGEND: E REPRESENTS ENCODER FOR OPTICAL TRANSMISSION.
D REPRESENTS DECODER FOR OPTICAL LINK.

BIDIRECTIONAL DIGITAL SERIAL INTERFACE FOR COMMUNICATION DIGITAL SIGNALS INCLUDING DIGITIZED AUDIO BETWEEN MICROPROCESSOR-BASED CONTROL AND TRANSCEIVER UNITS OF TWO-WAY RADIO COMMUNICATIONS EQUIPMENT

BACKGROUND OF INVENTION

1. Cross Reference to Related Applications

The invention pertains to a novel interface between at least one Control Unit and at least one Transceiver Unit of a two-way radio that is interrelated to the subject matter of the related copending patent applications entitled (1) Control System for Microprocessor And Software Enhanced Communications Equipment U.S. application Ser. No. 031,004 filed Mar. 27, 1987; (2) Computerized Multistandard, Field Convertible, Multiregional/Multiservice, Remote Controllable, Remote Programmable Mobile Two-Way Radio System With Digital Serial Bus Link, Built-In Programmer and Autodiagnostics, U.S. application Ser. No. 030,743 filed Mar. 27, 1987; (3) Audio Blanking Fill-In Method And Apparatus For Priority Multi-Channel Receivers, U.S. application Ser. No. 030,594 filed Mar. 27, 1987 which title was amended to read, An Interrupted Audio Fill-In System For Noise Reduction and Intelligibility Enhancement In Multi-Channel Scanning Receiver Applications, and issued as U.S. Pat. No. 4,868,891 on Sept. 19, 1989; (4) Variable Time Inversion Algorithm Controlled System For Multi-Level Speech Security, U.S. application Ser. No. 030,499, filed Mar. 27, 1987 and refiled on May 1, 1989 as U.S. application Ser. No. 07/346,282, the disclosures of which are incorporated herein by reference and (5) Combined Phase And Frequency Modulator For Modulating An Information Signal, filed Mar. 27, 1987, application Ser. No. 030,592, and issued as U.S. Pat. No. 4,739,288, on Apr. 19, 1988.

2. Field of the Invention

This invention pertains generally to two-way radio communications equipment, which includes two-way land/mobile communications equipment such as those used, for example, in law enforcement vehicles and headquarters. More particularly the invention pertains to a Bidirectional Digital Serial Interface System For Communicating Digital Signals Including Digitized Audio Between Microprocessor-Based Control And Transceiver Units of Two-Way Radio Communications Equipment.

The inventions provides a novel new Digital Serial Interface System for communicating digital signals, including digitized audio, between microprocessor-based Control and Transceiver Units of two-way land-/mobile or other communications equipment.

With the advent of increasingly powerful yet cost-effective microprocessors and memory devices, it has become more desirable to use digital techniques and microprocessor/memory devices in modern two-way radio communications equipment. Such new technology increases the capabilities and versatility of the communications equipment. In many cases, however, it necessitates new approaches in the design of various systems, the sub-systems, the peripherals and interfaces of the new equipment utilizing such enhancements.

3. Description of the Prior Art

Law enforcement vehicular officers and other large or stringent users have vastly more advanced needs than before, including the need to access different channels, variable power requirements, various speech/audio scrambling requirements, ability to enter the nationwide telephone network, ability to access permanent site repeaters, ability to make a vehicular radio inoperative as, for example, if the vehicle is stolen by criminals with whom apprehension is desired, the ability to receive and perhaps transmit pictorial data such as fax (facsimile) for pictures of criminals, cars, etc., ability to transmit and receive alphanumeric data such as vehicle license numbers, addresses, names and the like.

Therefore numerous physical electrical wires are needed to connect between the control unit, usually under the dashboard, and the transceiver unit, usually in the trunk. These wires in a bundle or unitary cable form become a physical burden when laying them between trunk and dash. Further they may radiate energy themselves when in use. Still further, they do not easily permit the noncustomized use of multiple transceivers as no networking form between a control unit and multiple transceivers is practical unless a network protocol is built into the system. Again one notes that such capabilities require a unitary digital system, previous to this invention not achieved. See U.S. Pat. No. 4,232,390 McEvilly, Jr. as to one control unit controlling a multiple number of transceivers.

This invention specifically addresses the interface aspects of new generation communications and control equipment employing extensive use of microprocessors in both Control and Transceiver Units, memory devices and other digital techniques. With such designs, each end of microprocessor-based communications equipment employs digital signals. Converting such signals to analog for conventional multiconductor interfacing poses many inherent problems. Analog signals in multiconductor connecting interface cables have susceptibility to noise related problems, particularly in mobile environments. Such cables may also radiate or leak analog signals in various parts of the R.F. spectrum, becoming a potential source of interference with the sensitive electronic control systems of modern vehicles. Additionally, with analog signals in conventional interface approaches, the increased control and other capabilities that become available with microprocessor based equipment, would require an equally proportionate increase in the numbers of conductors interconnecting Control Units with Transceiver Units. The same applies for the required multipin connectors. It is expensive and problematic to custom hand-produce such cables and individually solder or prepare the respective multipin connectors. On the other hand, mass-producing such cables and connectors limits their versatility with respect to meeting specific and diverse customer requirements. Obviously, it would be best to employ a new approach that will employ digital techniques, allow direct interfacing of digital signals and simplify the cabling and linking of control units with the communications equipment being controlled. Ideally, such a new approach should also allow full versatility to accommodate continuous changes in network parameters and operational requirements, without requiring continuous modifications in the linking medium between the Control and Transceiver Units.

The system of this invention meets the above requirements and provides a two-way serial communications system designed for baseband digital data transmission. It utilizes a TDM-PCM (Time Division Multiplex-Pulse Code Modulation) approach. The system also allows the interfacing and linking of digitized audio. A preferred embodiment advantageously utilizes the interface system of the invention for two-way land/mobile equipment. It includes a three channel TDM-PCM serial bus operating in a synchronous, full duplex mode and utilizing the Manchester II Code. The other embodiments of the invention may use the preferred embodiment with its specific coding/formatting or other schemes with the same system of the invention.

SUMMARY OF THE INVENTION

It is a primary objective of this invention to provide a new digital interface system for communicating digital signals, including digitized audio, between microprocessor-based Control and Transceiver Units of two-way land/mobile radios and other communications equipment, using a serial bus structure.

It is a related objective of the invention to provide a preferred embodiment with specific channel grouping and specific coding that will allow the advantageous utilization of the system of the invention in many communications equipment, especially in microprocessor based two-way land/mobile radio equipment.

A further object of the invention is its embodiment in different ways to produce new capabilities for communications equipment, such as the addition of remote programming and control-takeover of radio transceivers employing digital techniques.

Another aspect of the invention is the elimination of problematic, bulky multiconductor control cables and complex connectors used in conventional interfaces of Control Units with their respective Transceiver Units. With the system of the invention, two linking conductors need only be used (four conductors may be utilized in a differential mode for especially long distances).

It is a related object of the invention to allow comprehensive modifications during use of the equipment to accommodate changes in network parameters and operational requirements, without requiring modification of the linking medium between Control and Transceiver Units of radio communications equipment.

Yet another aspect of the invention is to accommodate modern optical fiber links between Control and Transceiver Units. Optical fiber cables are very compact and easy to install under carpeting or in tight quarters. They are immune to noise reception and radiation and are free from cross-coupling problems. Additionally, they require simple connectors in lieu of bulky, expensive and inherently inflexible multipin connectors of the prior art.

It is another object of the invention to allow field convertibility of sophisticated, software-enhanced, versatile two-way radios from a trunk-mount configuration into a dash-mount version (Transceiver and Control portions integrated into a combined package), without requiring changes in the physical connections between the two units whenever network or operational changes are accommodated through programming.

A further object of the invention is to use elements of the serialized digitized audio produced by the system of this invention to provide various types of audio processing, such as minimizing interchannel noise during scan. Similarly, the digitized audio stream may be manipulated through software programmed algorithms and other means to produce digital encryption in a very cost effective manner as a derivative of the system of this invention.

In another objective, the Digital Serial Interface System is used to allow the addition of remote control and utilization of external devices connected to microprocessor-based Control and Transceiver Units.

A further objective is to allow cloning of programs between communications equipment through this interface system so that the program in one equipment may be duplicated in others.

Another advantage of the system of this invention is the capability it can provide through one of its embodiments whereby one Transceiver Unit can be controlled through multiple Control Units. Similarly, through another embodiment, the system of the invention can allow one Control Unit to control multiple Transceiver Units that operate in the same or different frequency bands.

Yet another objective of the invention is to allow the addition of remote diagnostics for microprocessor-based communications equipment.

The system of the invention essentially comprises three subsystems: (1) an interface in the microprocessor-based Control Unit, (2) an interface in the microprocessor-based Transceiver Unit and (3) a two-way medium for linking the two units.

Various signals and audio in the Control Unit interact with a software-driven microprocessor of the Control Unit and are digitized. They are then translated into a serial format, organized in channel groups through a TDM (Time Division Multiplex)/PCM (Pulse Code Modulation) process and transmitted in frames through a two-way medium to the Transceiver Unit which is also microprocessor-based and incorporates a similar interface. The digital data that is being communicated to the Transceiver Unit then undergoes a reverse process. The Interface System is duplex (bidirectional)

A preferred embodiment of the Digital Serial Interface System for two-way radio equipment consists of essentially the same elements and employs a three channel TDM/PCM bus structure scheme, operated in a synchronous full duplex mode and using the Manchester II (Biphase L) format.

The preferred embodiment employs two types of frames; each type frame comprises two specific type channels. Each frame is 24 bits long.

In a first type frame, the first 8 bits represent a Command/Channel. The next 8 bits contain a Digitized Audio Channel (or word). The last 8 bits contain synchronization information and housekeeping (and for multiple control unit and transceivers: source address, destination address and token passing indicator [ack] (and the like) and is formed right at the 'edge' of the interface, right before entering the actual communications medium itself.

In a second type of frame, the first 8 bits represent the Status Channel (comprised of status bits) but otherwise similar to the Command-type frame. The Command-type frame can be transmitted at a maximum rate of once every two frames.

The digital data serial stream is transmitted onto the communications medium in Manchester II (Biphase-L) format. An example data rate of the serial interface of the invention is 192K bits/sec. (8 kHz audio sampling rate, with three 8-bit audio digitization samples per digitized audio word per 24-bit frame, - thus, $8k \times 8 \times 3 = 192k$). This data rate allows the digitized audio to be transmitted at a rate of 64K bit/sec. or 8K bytes/sec. The bandwidth required to transmit such data at a rate of 192k bits/sec. in Manchester II format is 192 KHz to 384 KHz. The Manchester II code recovers the receive lock signal from the received data stream, thus eliminating the need for a separate clock line, thus resulting in significant savings in transmission line costs. Additionally, the Manchester 11 format provides good noise immunity. This is due to the absence of low frequency or DC components in the transmitted data stream. Thus, the transmitted data stream may be AC coupled through isolation transformers for improved noise immunity in noisy environments. Another major advantage of the Manchester II encoding is its built-in error detection. Each received bit is checked for accuracy and the received clock is extracted from the received data stream so that there is no clock skew problem such as that associated with most digital data buses.

The physical transmission communications linking medium is designed to adapt to three different kinds of cable depending on the application. In its simplest form, the linking medium is a 2-wire full duplex unipolar (single ended) transmission link. For especially longer distances or very noisy environments, the linking medium bus is a 4 wire full duplex bipolar (differential mode) transmission link. For certain applications, a third configuration is a 2-conductor optical fiber full duplex unipolar transmission link.

The different embodiments and applications of the invention may be combined in part or wholly with the preferred embodiment using the preferred grouping, formatting and coding scheme. They may also be combined in part or wholly with the general system of this invention utilizing other coding/formatting schemes for the same system which uses only two communicating paths between Control and Transceiver Units.

DETAILED DESCRIPTION OF DRAWINGS

Some of the following drawings and related text directly describe the Digital Serial Interface System of the invention. Other drawings and descriptions relate to its embodiment and the applications it allows in two-way radio systems. Many of these embodiments and applications may be better understood and relate to circuits, software, etc. as described in detail in the cross referenced Item (2) copending application.

Figure 1A:
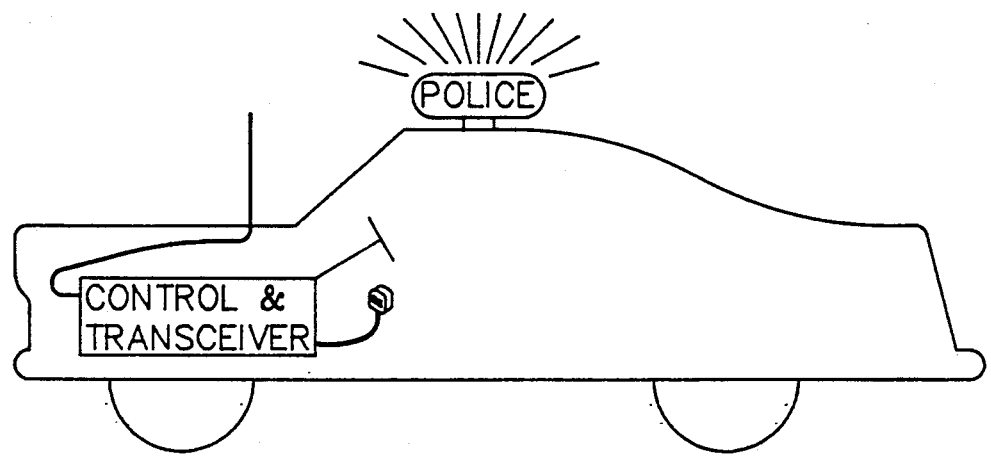
FIG. 1(a) shows a unified Control Unit/Transceiver Unit two-way radio mounted in a vehicle and commonly used for simpler applications.

FIG. 1(a) illustrates a two-way radio with unified controls and radio frequency unit that is installed in a vehicle. Such equipment is commonly used for more rudimentary, simpler applications.

Figure 1B:
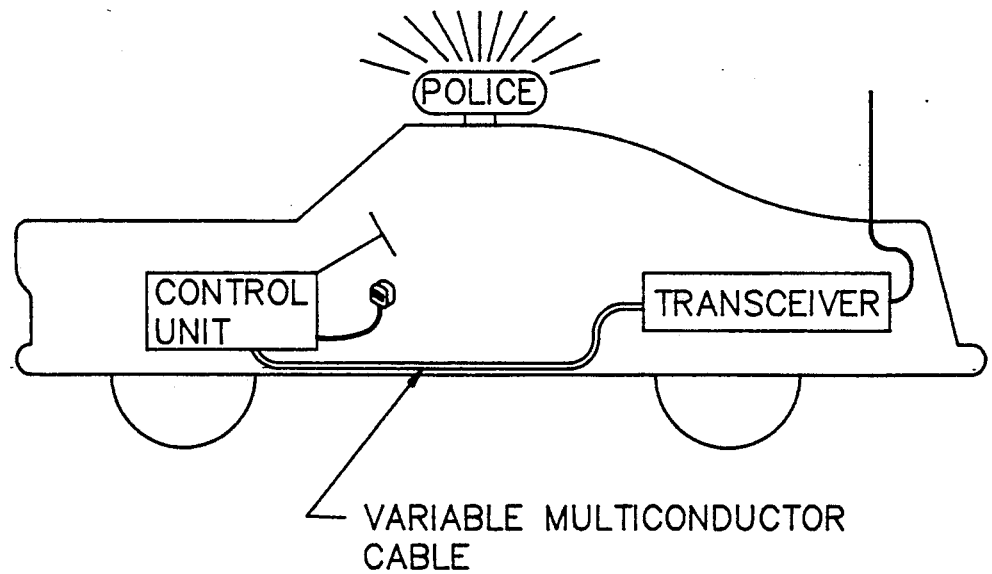
FIG. 1(b) shows a recent prior art radio with separate Control Unit, separate Transceiver Unit and a multiconductor control cable connecting the two units that is typically used for more complex applications, where the number of control cable conductors varies with the capabilities required.

FIG. 1(b) illustrates a two-way radio that consists of a separate Control and Transceiver Units that is installed in a vehicle. Such equipment is commonly used in more sophisticated applications. This requires a more complex and typically larger equipment. Since vehicle sizes are diminishing and the size of a complex combined Control/Transceiver radio would inherently be larger, the Control Unit and Transceiver are separated, with the Transceiver Unit commonly installed in the trunk of the vehicle.

Another reason for installing the Transceiver part of the radio in a locked Trunk is to thwart the theft of the equipment. The exposed Control Unit would be useless alone and is the less expensive part of the radio equipment. Also, sophisticated equipment used by various special and security conscious organizations needs to be protected from undesirable entities who might otherwise acquire and apply it for unlawful activities.

The most problematic part of such an approach is the Control Cable required combining the Control Unit with the Transceiver Unit. Such Control Cables have multiple conductors, increasing in number depending on the complexity of the capabilities and design. The multiple pin connectors on such cables and their mating multiple contact connectors are bulky and expensive to produce and also would require changes for special and complex applications.

When microprocessor/software designs are utilized in modern two-way radios, greatly increased and software programmable capabilities can be derived to meet the idiosyncrasies of growing or changing large networks and changes in operational requirements. As networks grow and cover more regions, add more users, coordinate more and demand more from two-way radios, these changes are inevitable. Designing around microprocessor/software programmable capabilities would accommodate most of these changes were it not for the fixed conductor cables. This problem even arises when an ordinary trunk-mount radio is customized for a special complex application. It almost certainly requires a special Control Cable which also remains constant and impedes further versatility. Thus there is the dilemma of either mass manufacturing conventional control cables and suffering from lack of versatility or doing expensive customizing as required. The system of the invention obviates this problem and allows the use of one type of cable while providing outstanding advantages and versatility.

Figure 2:
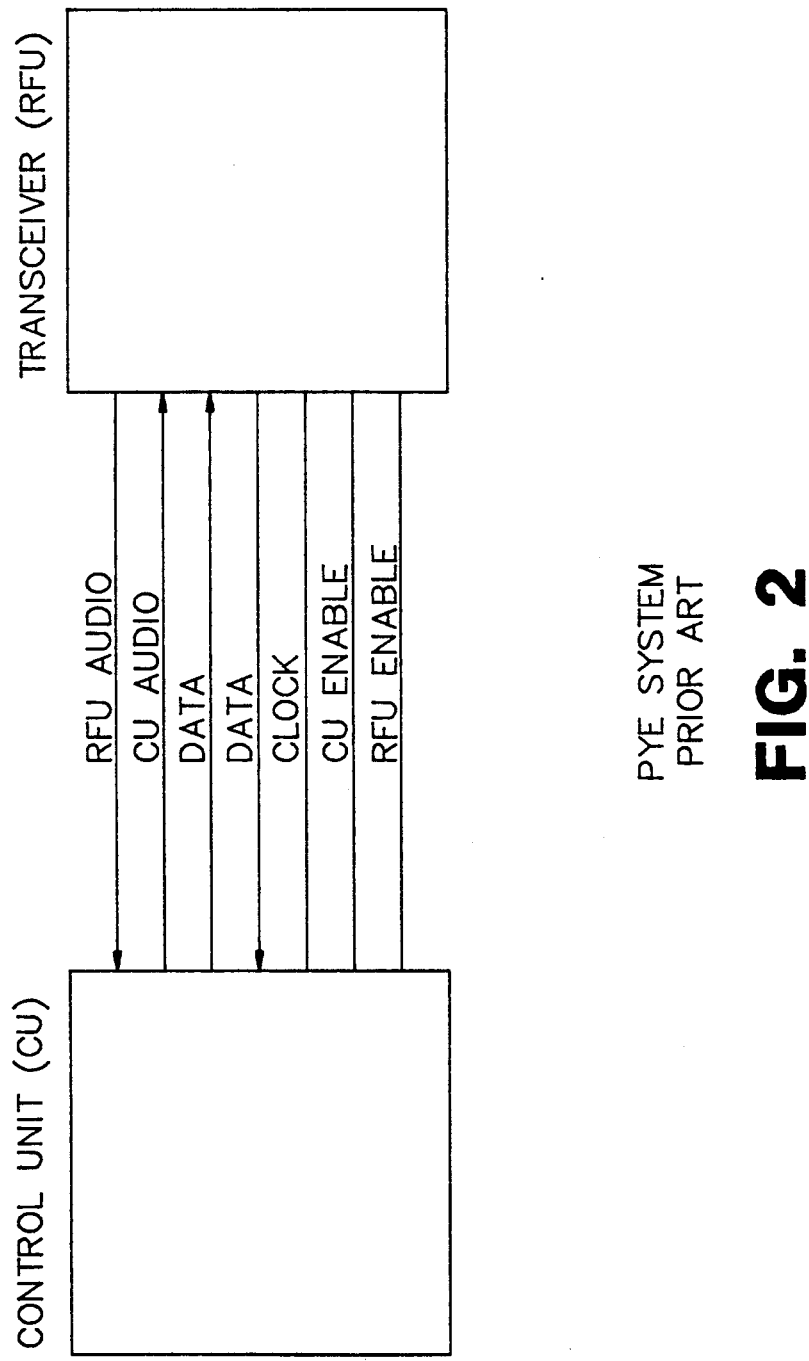
FIG. 2 shows a recent prior art radio block diagram with multiconductor connection between the Control Unit and the Transceiver Unit, having separate analog audio, digital data and control paths.

FIG. 2 illustrates a recent prior art radio block diagram. Although this equipment represents the PYE system of England and employs a microprocessor approach, it does not use the Digital Serial Interface approach of the invention. Instead, multiple conductor corrections are utilized between Control and Transceiver Unit, for separate analog audio, data and control paths.

Figure 3:
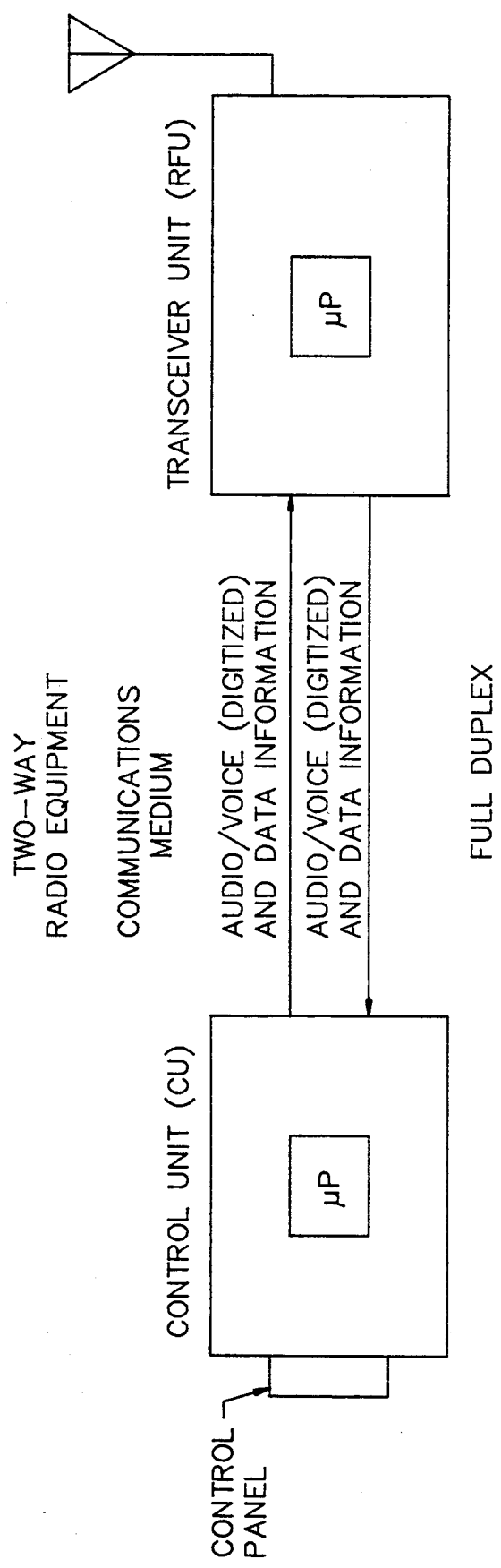
FIG. 3 shows the system block diagram of the invention with only two physical paths needed in the communications medium between a microprocessor-based Control Unit, and a microprocessor-based Transceiver Unit.

In contrast the preferred embodiment of the present invention employs a digital serial interface which in the system's block diagram in FIG. 3 of the drawing illustrates the principle of the invention. The Digital Serial Interface System essentially provides organized digital communications for both audio, which has been sampled and digitized, and also data information between a Control Unit and a Transceiver Unit of two-way radio equipment. Synchronizing information is provided in the information transmittal and thus no separate synch line(s) are required.

Figure 4:
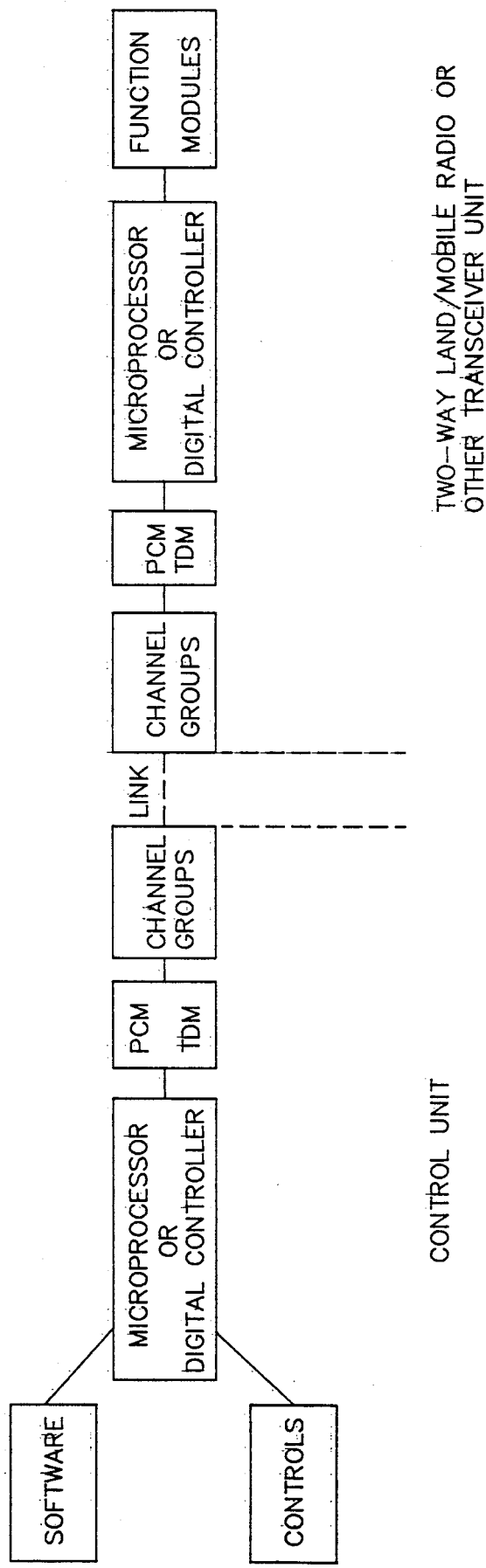
FIG. 4 shows a general block diagram of the Digital Serial Interface of the invention.

Referring now to FIG. 4 of the drawings, the block diagram illustrates the principle of the invention in further detail. The Digital Serial Interface System essentially provides organized serial communications between a Control Unit and a Transceiver Unit of the communications equipment. Each of these units has a microprocessor, a multiplexing-coding system (TDM-PCM), channel grouping for the digital data and a communications medium (physical link) for transmission.

Microprocessors and software will be increasingly used in communications equipment, such as two-way land/mobile radios, to provide extensive features, increased control facilities, additional capabilities, many enhancements and versatility. Within a given realm for which it is designed, a modern, versatile microprocessor has a range of capabilities depending on the software and related command system that control it. Thus, referring to FIG. 4 and the Control Unit section of the drawing, the block diagram illustrates a microprocessor, its related software and its controls. Most communications equipment also include an audio input, typically through a microphone, which being a peripheral device, is not shown in the drawing.

The Control Unit Microprocessor System produces signals in digital form that are essentially proscribed by the software and its related controls. The audio is also digitized.

At this point, it is important to note that a vast number of two-way signals are produced in microprocessor-enhanced complex communications equipment. These include signals related to commands, status, audio, 'housekeeping', automatic diagnostics, displays, etc. It is, therefore, necessary to provide an interface system that can communicate these signals in an orderly fashion, without errors, without interaction problems and with efficiency. The system must also allow versatility to accommodate custom requirements, operational changes and idiosyncrasies of individual modern, complex and constantly changing communications networks. The Interface System of the invention accomplishes all the aforementioned.

Referring again to FIG. 4, the signals from the Microprocessor of the Control Unit are applied to a TDM-PCM System which provides a means of multiplexing and coding the signals for identification and synchronization and also translates them into a serial stream. The resultant serial data is organized in channels which are then transmitted in frames. The frames, in general, may include several channels.

Upon receipt, the data transmitted from the Control Unit section undergoes a reverse process on the Transceiver Unit side as shown in FIG. 4, providing the required communications to the Function Modules of the Transceiver Unit. The system is duplex in that the Transceiver Unit/Function Modules communicate with the Control Unit in an essentially similar manner.

The novel aspects of this invention can be used with different types of coding, formatting and organizing of the data and even for derivative configurations. All these are deemed as essentially being within the scope of the overall invention.

Figure 5:
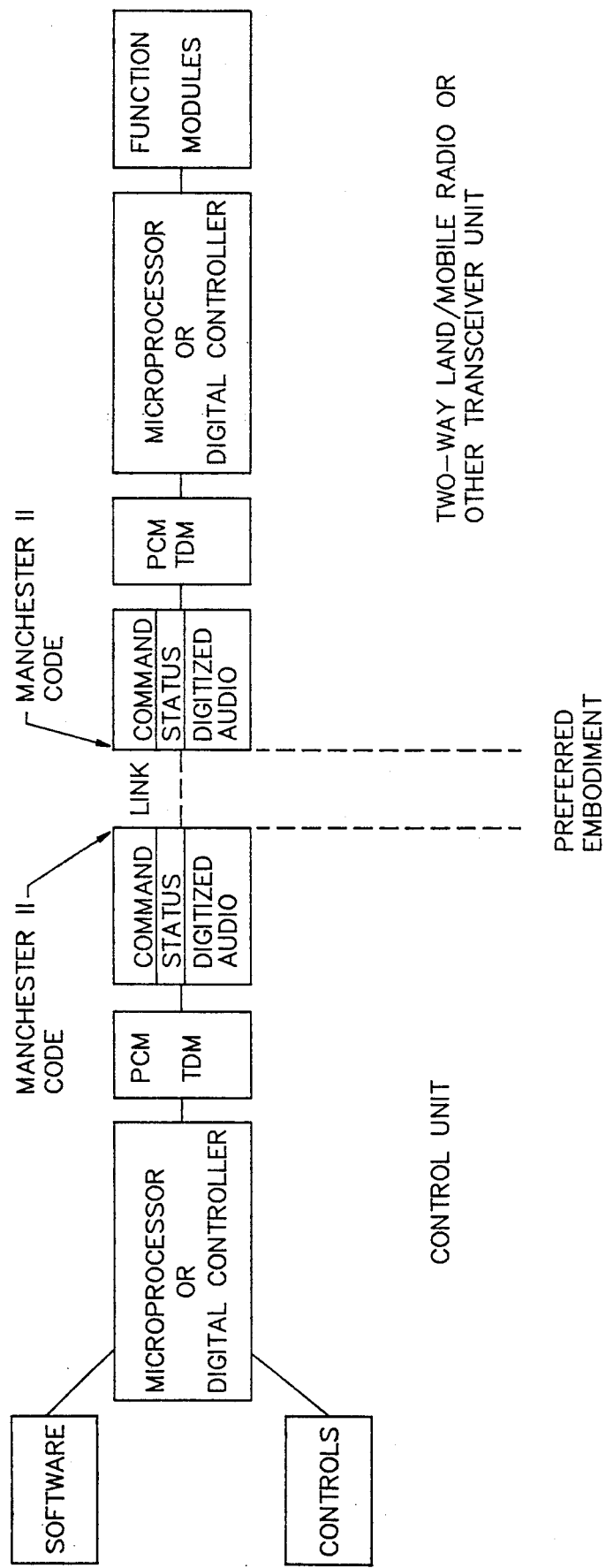
FIG. 5 shows a block diagram of a preferred embodiment of the invention wherein a 2-path link is provided between two sets of TDM - PCM devices and wherein digitized audio and digital signals are serialized, organized into Command, Status and Audio Channels and transmitted in frames of two channels over the linking medium using Manchester II coding.

FIG. 5 illustrates the general block diagram of a preferred embodiment of the invention, with a preferred formatting and coding scheme. This embodiment incorporates a three channel serial bus structure operating in a synchronous, full duplex mode and utilizing the Manchester II Code.

This embodiment of the invention provides a communications path between Control Units and Transceiver Units of two-way land/mobile radios or other communications equipment. This Interface System also provides a medium for digitized audio between the two units.

Specifically, the three channels (words) of the Serial Interface Bus of the preferred embodiment consist of a Command Channel, a Status Channel, and a Digitized Audio Channel. Command words is the message format to transmit byte-oriented data. It may take a variable number of command words to make up a complete message. Status words contain single-bit data elements grouped in groups of 8 bits such as CCMP PTT, BSY DET, TX ON, scan interrupt status, etc.

Figure 6:
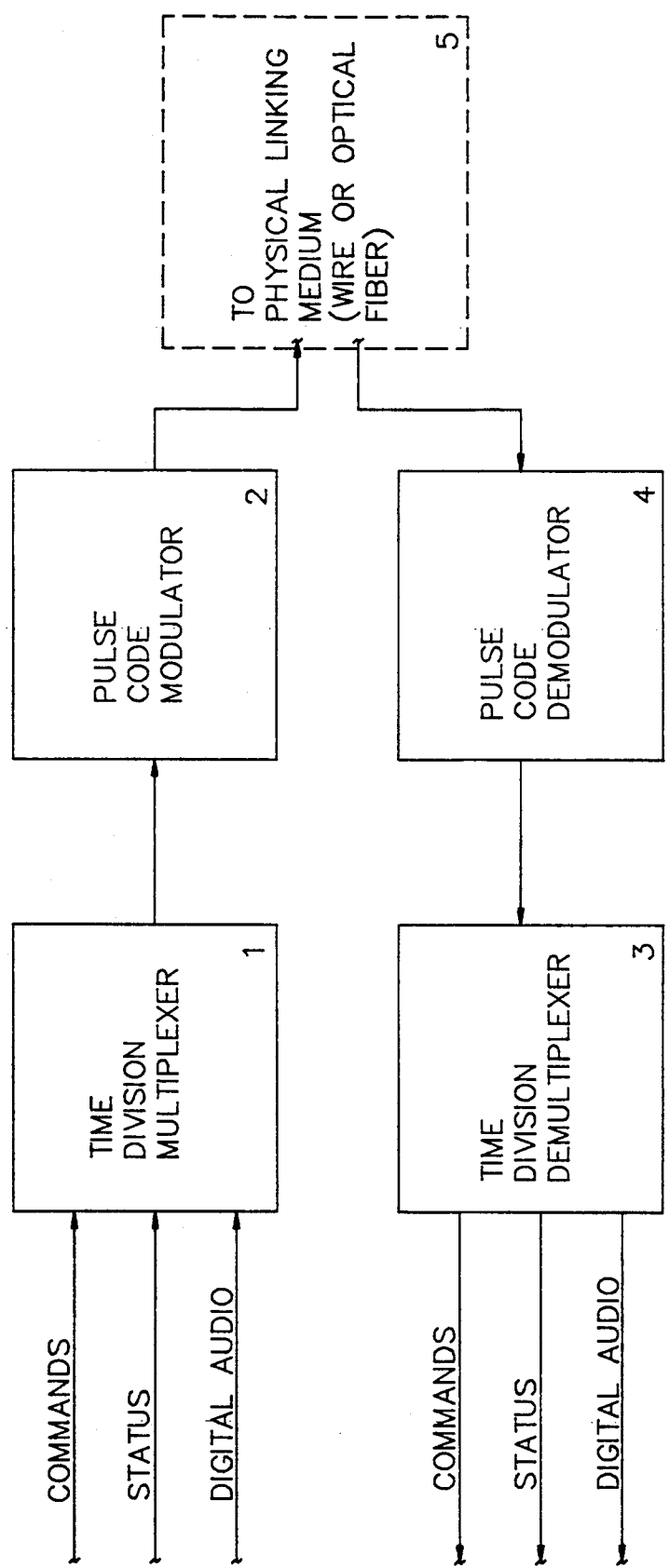
FIG. 6 shows a block diagram of the Digital Serial Interface of the invention.

FIG. 6 shows a detailed block diagram of a general preferred embodiment of the electronics of the serial interface of the invention at either side of the communications medium.

At the highest level, the Digital Serial Interface System consists of 5 major blocks. Blocks 1 through 4 are required to be duplicated at the other side of block 5. However, their functions are the same.

Each unit desiring to communicate using the Digital Serial Interface System must have a time division multiplexer (block 1), a pulse code modulator (block 2), a time division demultiplexer (block 3), a pulse code demodulator (block 4), and a physical medium (block 5).

Figure 7:
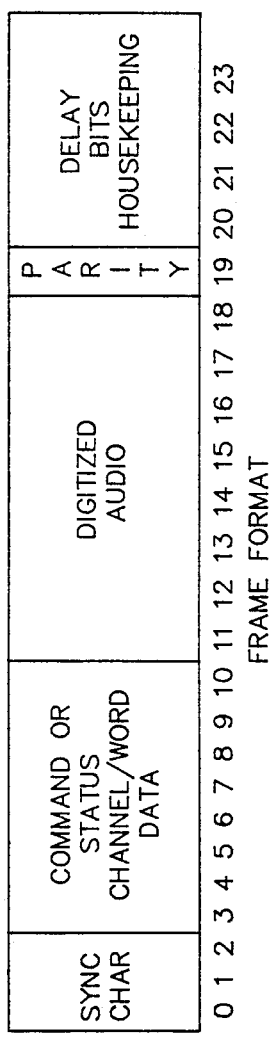
FIG. 7 shows a frame format for a single Control Unit, single Transceiver system.
Figure 7:
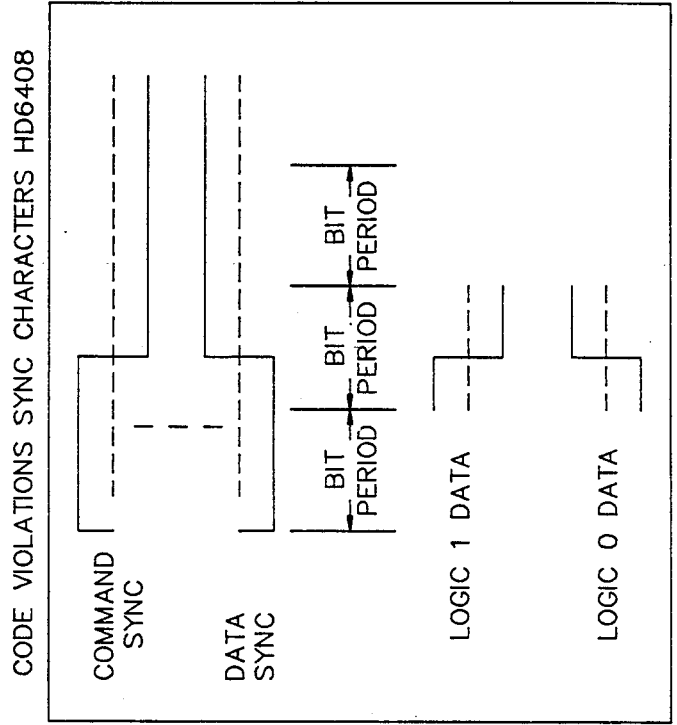

In FIG. 6, we choose to show 3 digital channels (or words) being multiplexed into a single (serial) frame using a time division multiplexer (block 1). These 3 channels (or words) are (digital) commands (byte), (digital) status (words of status bits), and digitized audio as shown in FIG. 7. However, the number of channels could be extended to any number, or in another embodiment, a frame may be comprised of a digitized audio (channel) word with either (but not both) a command channel or a status channel.

The serial digital frame is sent to the Pulse Code Modulator in non-return-to-zero (NRZ) digital format and is converted to Manchester II Code (biphase-L) for transmission over the physical communications medium.

At the receiving unit from the physical communication medium, the Manchester Code signal is converted to non-return-to-zero (NRZ) format by the Pulse Code Demodulator (block 4). Then the serial digital frame is demultiplexed by the Time Division Demultiplexer into 3 channels (words) of digital data. We choose to identify the three as commands, status, and digitized audio. However, the number of channels could be extended to any number provided that this number agrees with the number of channels multiplexed by the transmitting unit.

The advantage of using time division multiplexing is that it allows multiple channels of information to be transmitted over a single physical medium, thus reducing and 'standardizing' the hardware required for transmission.

The advantage of using the pulse code modulation is that it is simple to implement and provides an accurate means of transmission over short distances (less than 50 ft).

See "Electronic Communication Systems" by William D. Stanley, Reston Pub. Co. 1982 at p. 314 et. seq. 299 et. seq. Also see Jayant, N. S., p.s., Noll, Peter, "Digital Coding of Waveforms", Prentice-Hall, Englewood Cliffs, N.J., 1984 at p. 221 et. seq., and Bellamy, John C., "Digital Telephony", New York-Wiley at p. 203 et seq.

The Channel/word information of all 3 types, in one preferred embodiment, is transmitted in units called frames. The format of a frame is irrelevant to the heart of this invention. The essence is that both digital data information or digitized audio or a combination of units of both of them can form a frame. In a preferred embodiment, to be in use, each frame consists of two channel/words and is 24 bits long. The first eight bits represent the Command Channel or the Status Channel, depending on which is selected. The Command Channel can be transmitted at a maximum rate of one time every two frames. The next eight bits represent the Digitized Audio (Channel) word. The last eight bits contain synchronization information and housekeeping information. In multiple control units and/or multiple transceiver units embodiment, this field may be expanded to carry source address, destination address, and token passing information in a token passing communications net structure.

In the basic approach, 16 out of every 24 bits represent useful information that is transmitted across the transmission communication link medium. This represents an efficiency of app. 67% with app. 33% of the transmitted data being used for overhead.

As stated above, the data rate of the Serial Interface Bus of the preferred embodiment is 192 kbits/sec. This data rate allows the digitized audio to be transmitted at a rate of 64 kbits/sec. or 8 kbytes/sec. The digital data stream is transmitted in Manchester II (Biphase-L) format. The bandwidth required to transmit data at the rate of 192 kbits/sec. in Manchester II format is 192 KHz to 384 KHz.

The system of the invention, in this specific embodiment and combined with the Manchester II Code which provides for in-data syncing, provides special advantages for communications equipment designers and end-users, in addition to the overall advantages of the general system. The Manchester II Code recovers the receive clock signal from the received data stream, thus eliminating the need for a separate clock line. This results in a significant savings in transmission line costs. This coding combined with the System of the invention also provides good noise immunity. This is due to the absence of low frequency or DC components in the transmitted data stream. This allows the coupling of the transmitted data through isolation transformers for improved noise immunity in noisy environments. Another major advantage of this preferred embodiment is its built-in error detection through the Manchester II Coding utilized. Each received bit is checked for accuracy and the received clock is extracted from the received data stream, so there is no clock skew problem that plagues most data buses.

The preferred embodiment is ideally suited for two-way land/mobile radio communications equipment. It can be modified to meet specific requirements within the general realm of the invention or the preferred embodiment described. This preferred embodiment or its derivatives can also be used with many other types of communications equipment, as well as with all the other embodiments herein described.

It is, of course, possible to use the overall or specific ideas of this embodiment with variations in the organizing of groups, coding data rate, channel bit length, frame size and other related parameters. However, being based on the same concept, these variations are considered as being essentially within the scope of this invention.

Figure 8:
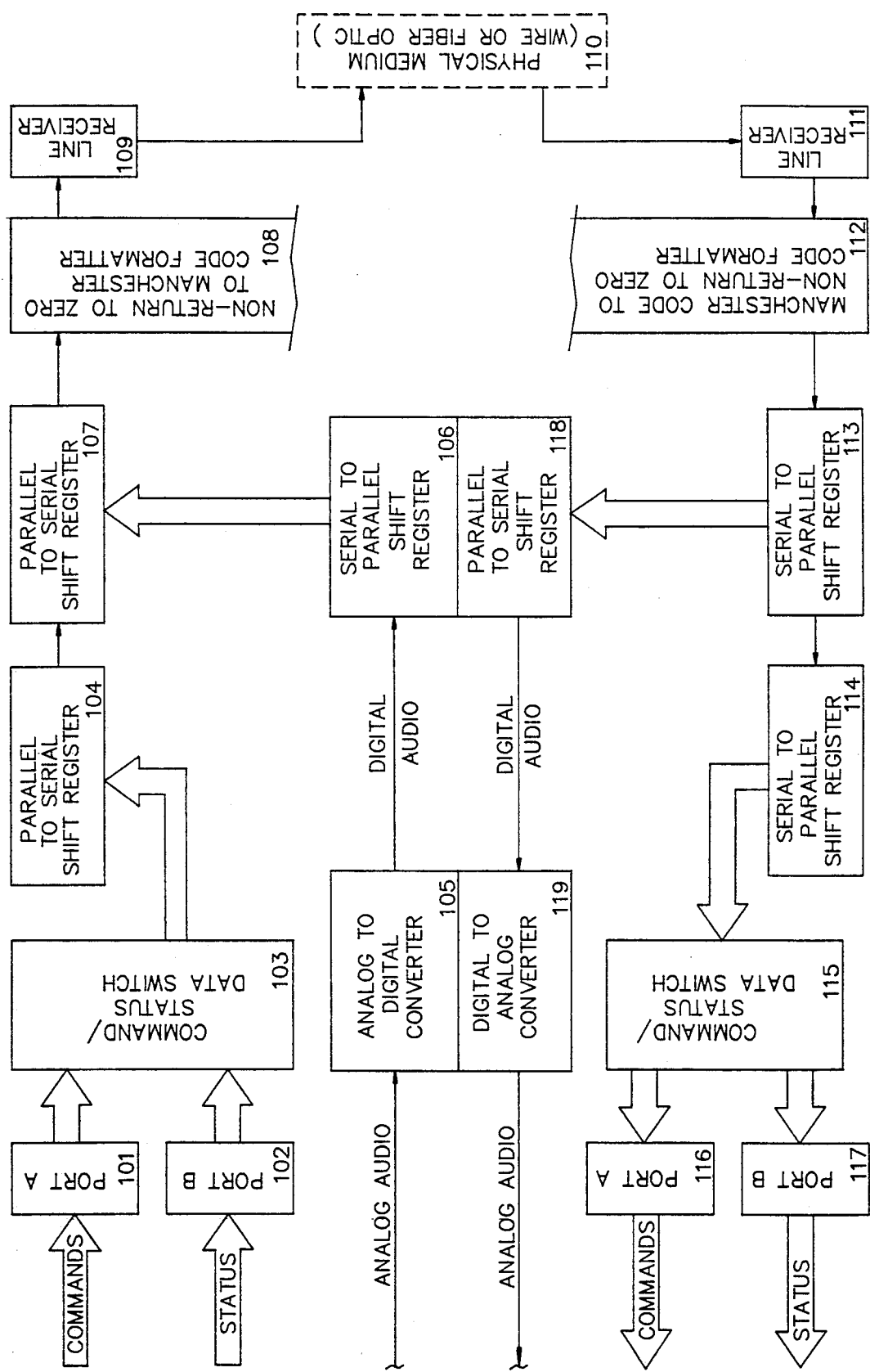
FIG. 8 shows a detailed block diagram of an Interface Unit (serializer/deserializer) at either the Control Unit or Transceiver Unit for a single Control Unit, single Transceiver Unit equipment in accordance with the invention which also includes within the scope of this invention more direct ways of transferring data between encoder and ports.

FIG. 8 shows the functional block diagram of a preferred embodiment of the invention wherein the predefined frame is that in accordance with FIG. 7.

At the functional block diagram level there are 19 major blocks that make up the digital serial interface system. Blocks 101, 102, 103, 104, 106 and 107 make up the Time Division Multiplexer (FIG. 6 - Block 1). Blocks 108 and 109 make up the Pulse Code Modulator (FIG. 6 - Block 2). Block 110 is FIG. 6(a) - Block 5. Blocks 111 and 112 make up the Pulse Code Demodulator (Block 4). Blocks 113, 114, 115, 116, 117, and 118 make up the Time Division Demultiplexer (FIG. 6 - Block 3). Blocks 115 and 119 were not shown on FIG. 6. They are not required in a Time Division Multiplexed - Pulsed Code modulation system. However, in a TDM-PCM system used to transmit audio (voice) information such as here they must be included.

Figure 9:
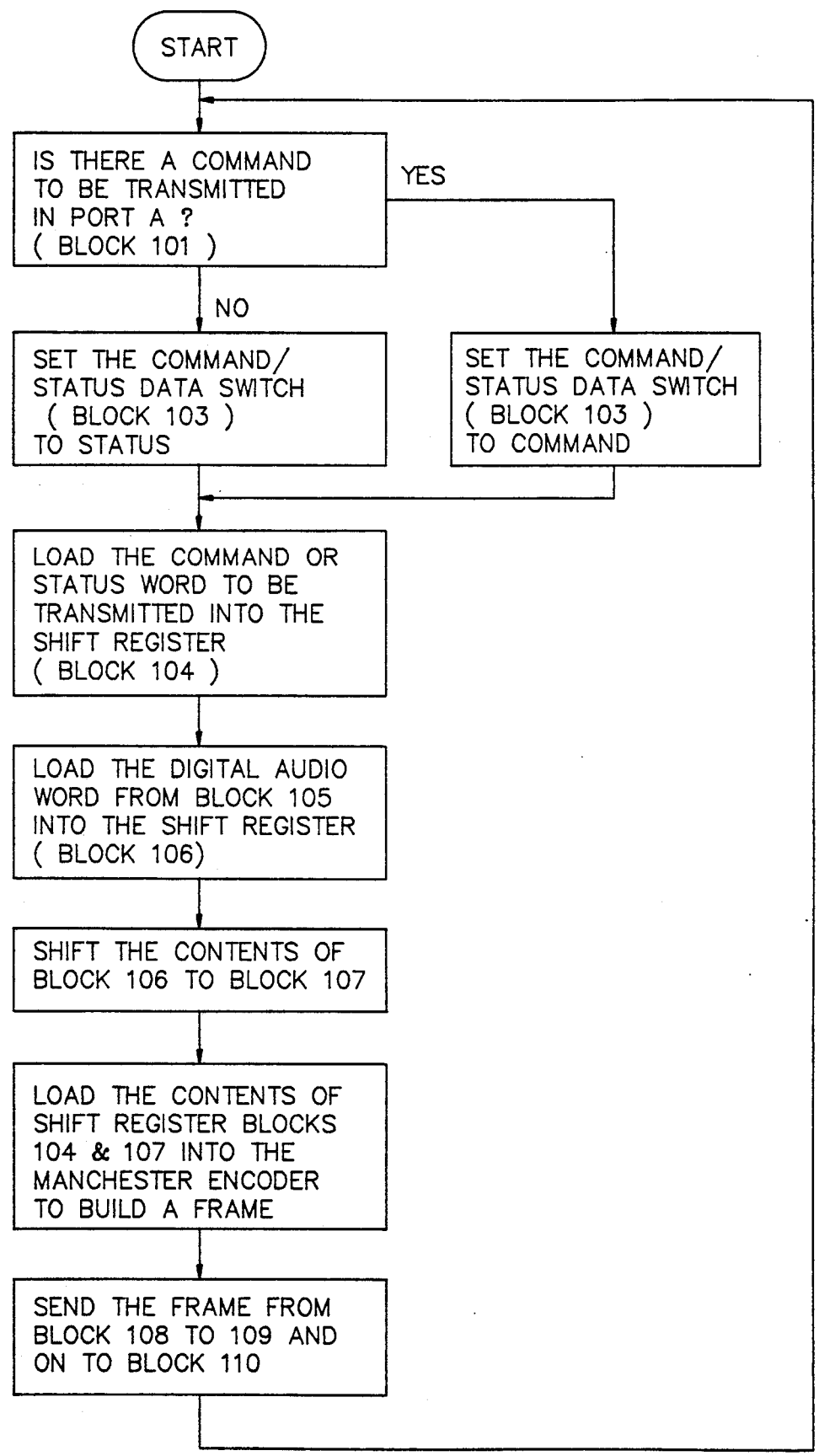
FIG. 9 is an illustration of a flow chart of a serializer.
Figure 10:
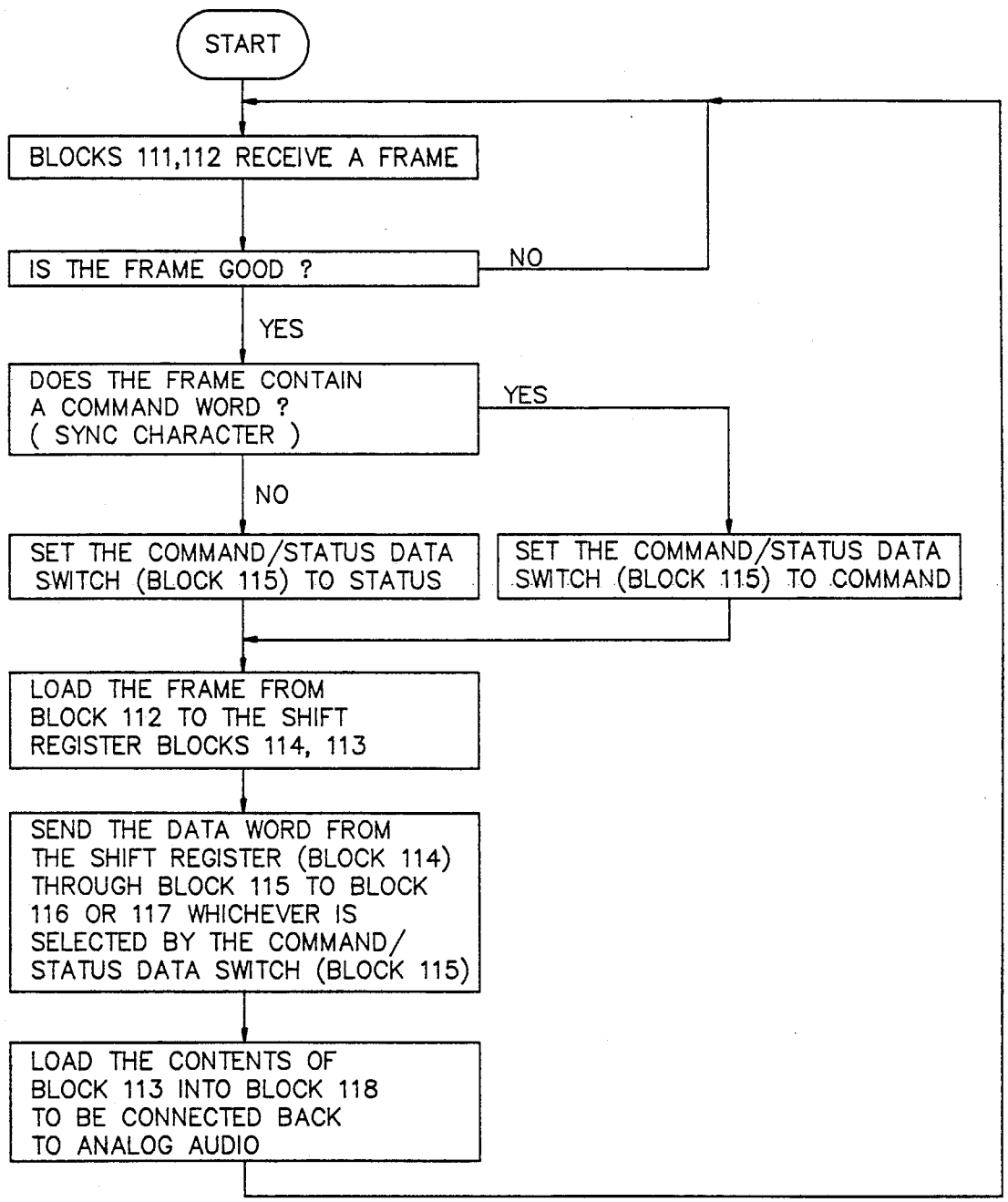
FIG. 10 is an illustration of a flow chart of a deserializer.

Flowcharts for the operation of the Digital Serial Interface System are illustrated in FIGS. 9 and 10. FIG. 9 illustrates the operation of the TDM/PCM 'transmitter' and FIG. 10 illustrates the operation of the TDM/PCM 'receiver'.

For conceptual purposes, the frame formation and serial transmission onto a physical communication medium of digitized audio data and digital data, the latter in the form of command channels and status channels, can be considered a serializer.

The reception and decomposition of such frames by a reverse process can be considered a deserializer.

Referring to FIGS. 8 and 9, the TDM/PCM transmitter starts by looking at Port A (FIG. 8 - Block 101) to see if a command word needs transmitting. If so, it then sets the Command/Status data switch (FIG. 8 - Block 103) to the correct side to load the shift register (Block 104). Next the Command or Status Word is loaded into Block 104. Now a digital Audio Word is loaded from Block 105 to Block 106. Then the Digital Audio Word is shifted from Block 6 to the shift register Block 107. Blocks 104, 107 make up the information to be transmitted in the frame. Blocks 104, 107 contents are loaded into Block 108 to build a frame. After the frame is built, it is transmitted through Block 109 and onto Block 110.

Referring to FIG. 8 and FIG. 10, the TDM/PCM receiver starts by, at FIG. 8 - Block 112 looking for synchronization characters that indicate the beginning of a received frame. After the frame is received by Block 112 it is checked to see if it is a valid frame. If it is a valid frame, then the frame is checked to see if it contains a Command Word or a Status Word by looking at the received SYNC character itself in the frame. The command/status data switch is then set and the information field of the received frame is loaded into registers (Blocks) 114, 113. From Block 114, the command or status word goes through Blocks 115 to its correct destination Blocks 116 or 117. The contents of Block 113 are loaded into Block 118 to be converted back to analog audio.

Figure 11:
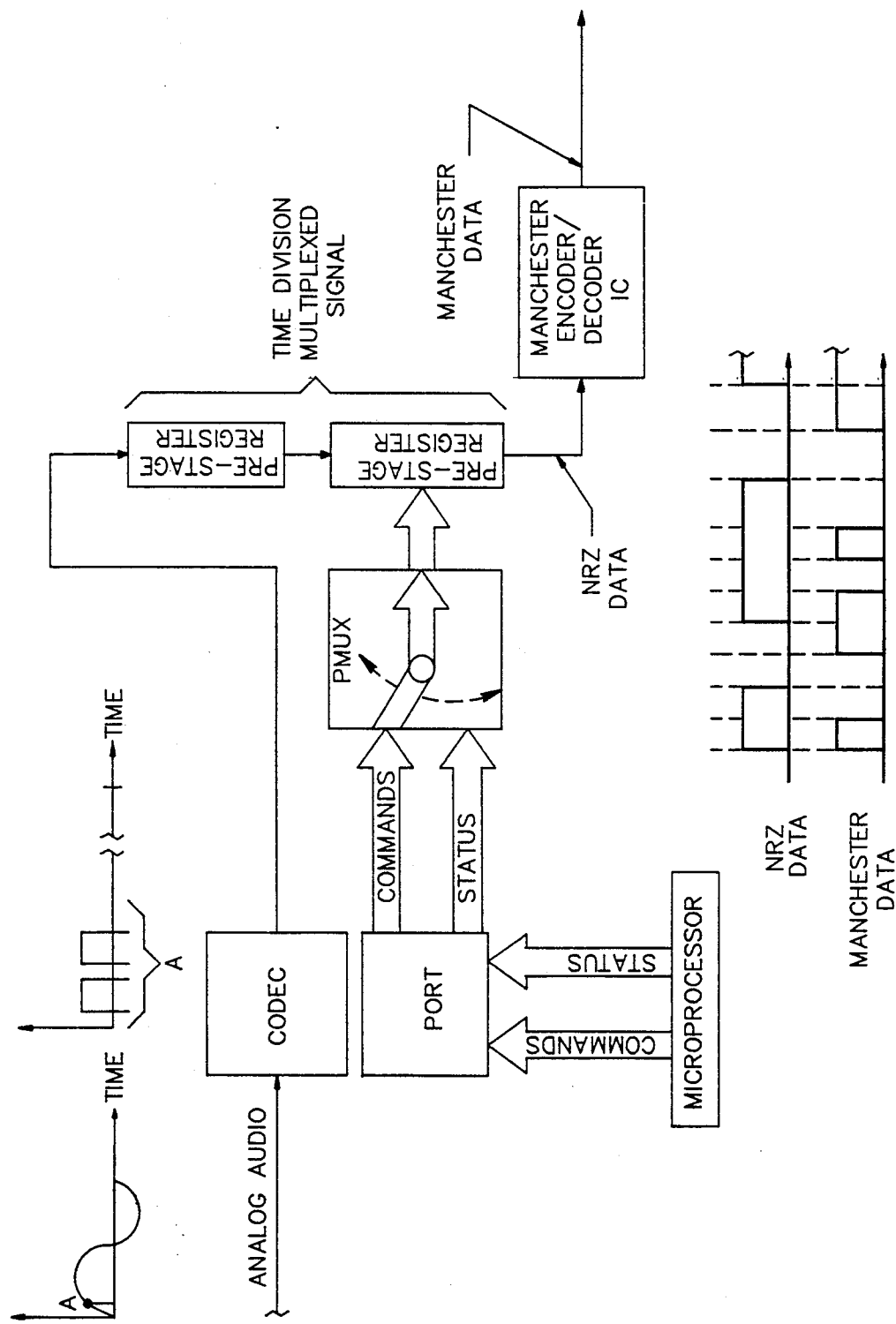
FIG. 11 is an illustration of an alternative system for a serializer.

FIG. 11 describes a more detailed block diagram of a preferred embodiment of a serializer of the invention. Analog audio is converted to digital audio by means of some form of analog - to - digital conversion. In a preferred embodiment, a Harris HC-5554 ( or 5552) serial COFIDEC chip is used to convert from analog audio to mu-law-255 digitized (8 bit) audio. The output of the CODEC is a digital (serial) form of audio sample, sampled periodically at a 8 kHz rate.

Data information in the form of Command and/or Status Words are formed by the microprogrammer or microprocessor and are sent to respective sections of a port. A portion of a multiplexor (call it P'MUX) comprising a) a channel switch to select either the Command or Status Word, and b) a set of prestage registers to combine a digital Audio Word with either the Command or Status Word is used to produce a Time-Division-Multiplexed digital signal.

This signal in NRZ electrical form is sent to a Manchester Encoder/Decoder chip, such as the Harris HD6408, which in conjunction with other logic, controls the operation of the CODEC and the P'MUX to produce the synch character, parity, delay bits (overhead and token passing word) and to produce the Manchester II encoded signal of the assembled frame which is transmitted to the communications medium (bus). To permit multiple control units and/or multiple transceiver units to operate on the same bus effectively, an (IBM-style) Token Passing protocol is built into the firmware and software of the Control Units with associated firmware/software at the Transceiver Units and makes use of token passing, source address, destination address and a token bit in each frame word transmitted. Manchester II is a form of Pulse Code Modulation operating on a digital baseband wherein for a '0' in Manchester II: $-V$ volts is sent for the first half of the sampling interval and $+V$ is sent for the second half of the sampling interval. A '1' is transmitted by sending $+V$ volts for the first half of the sampling interval and $-V$ volts for the second half of the sampling interval (In NRZ a long string of identical bits would result in a constant being continuously transmitted which could have serious consequences upon timing). In Manchester II, therefore, a transition is generated for each digital 'bit' transmitted, whether a '0' or a '1'.

To insure synchronization at all times, so-called code-violations occur when there are no transitions, such as when just about to start and thus only when valid-Synch character signals are received. (see MIL-STD-1553)

In a preferred embodiment, the following standard was adopted:
CV1 CV1 CV0 = Command Synch = 1st 3 bits of frame
CV0 CV0 CV1 Status Synch
where CV1 represents $+V+V$ (both halves of a bit are at $+V$) and
CV0 represents 0V0V or $-V-V$ (both halves of a bit are at 0V or $-V$).

Figure 12:
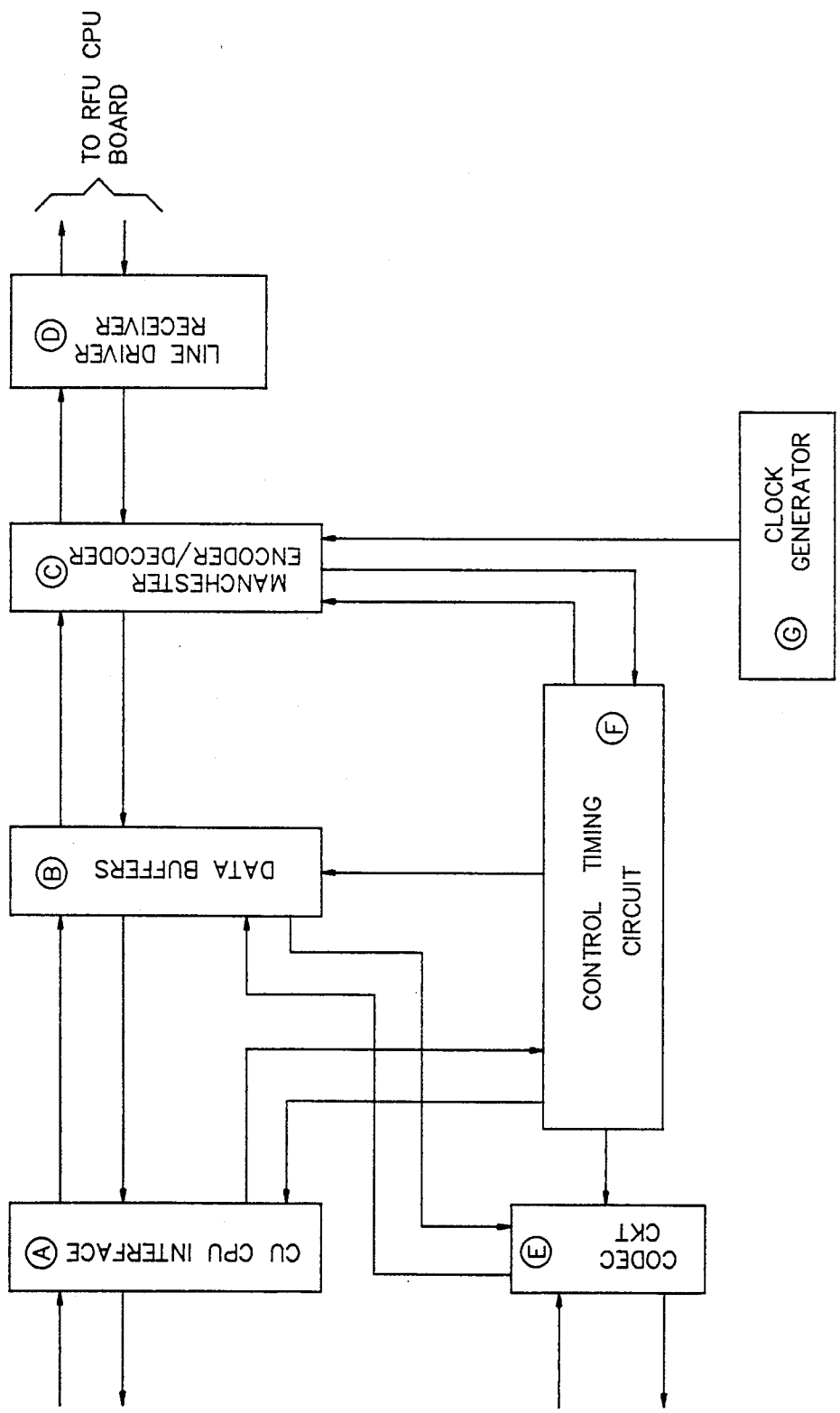
FIG. 12 illustrates a Control Unit-based serializer/deserializer function block diagram.

FIG. 12 shows a control unit CU PCM board functional block diagram and is, in essence, the functional block diagram of FIG. 8. The ports of FIG. 8 are of the nature of Harris 82 C55A CMOS Programmable Peripheral Interface chips or the like.

Figure 13:
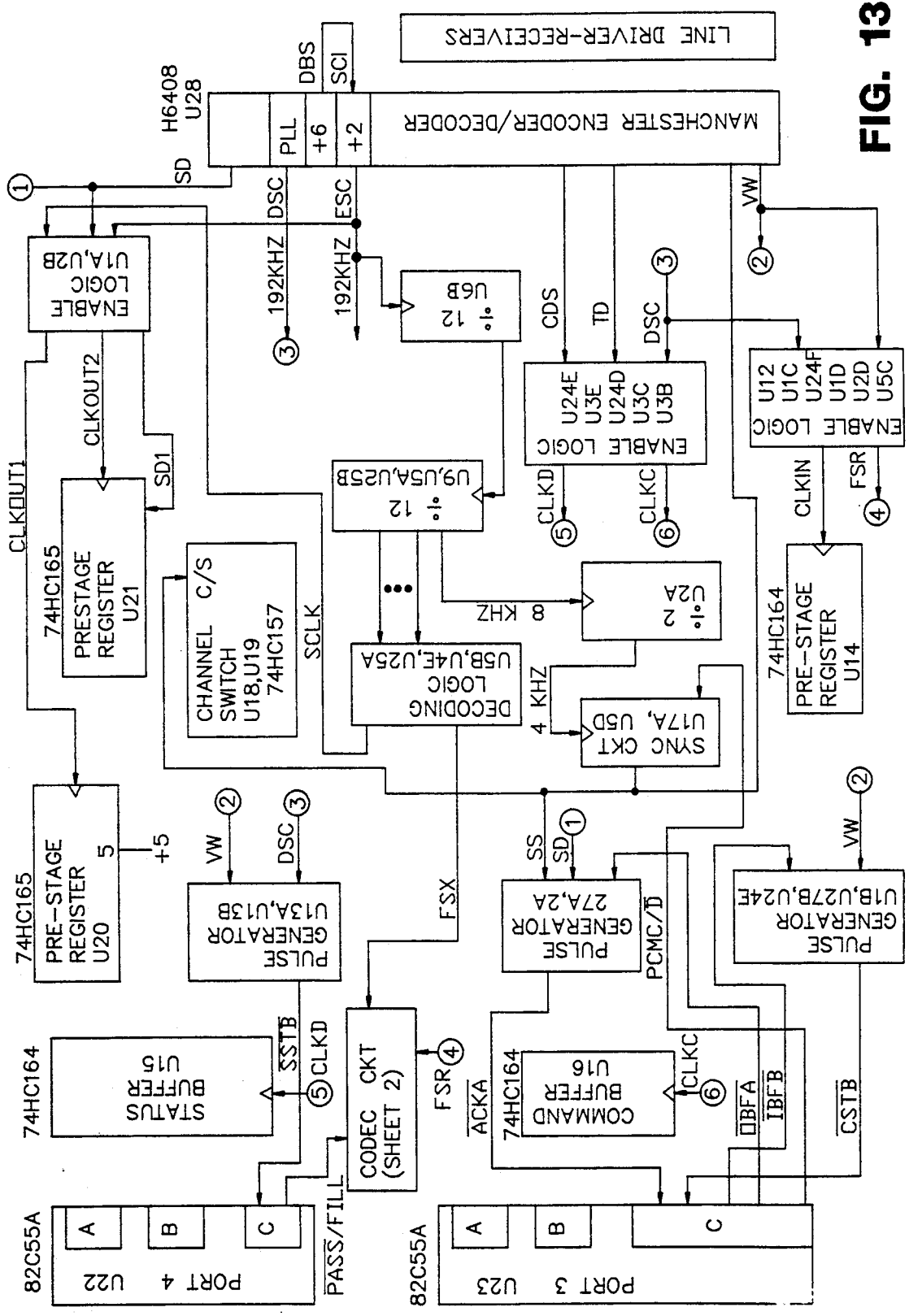
FIG. 13 is an illustration of a detailed block diagram of a Transceiver Unit (RFU) - based serializer/deserializer showing control timing generation.

FIG. 13 shows the RFU (Transceiver) functional description for the interface aspects.

Figure 14:
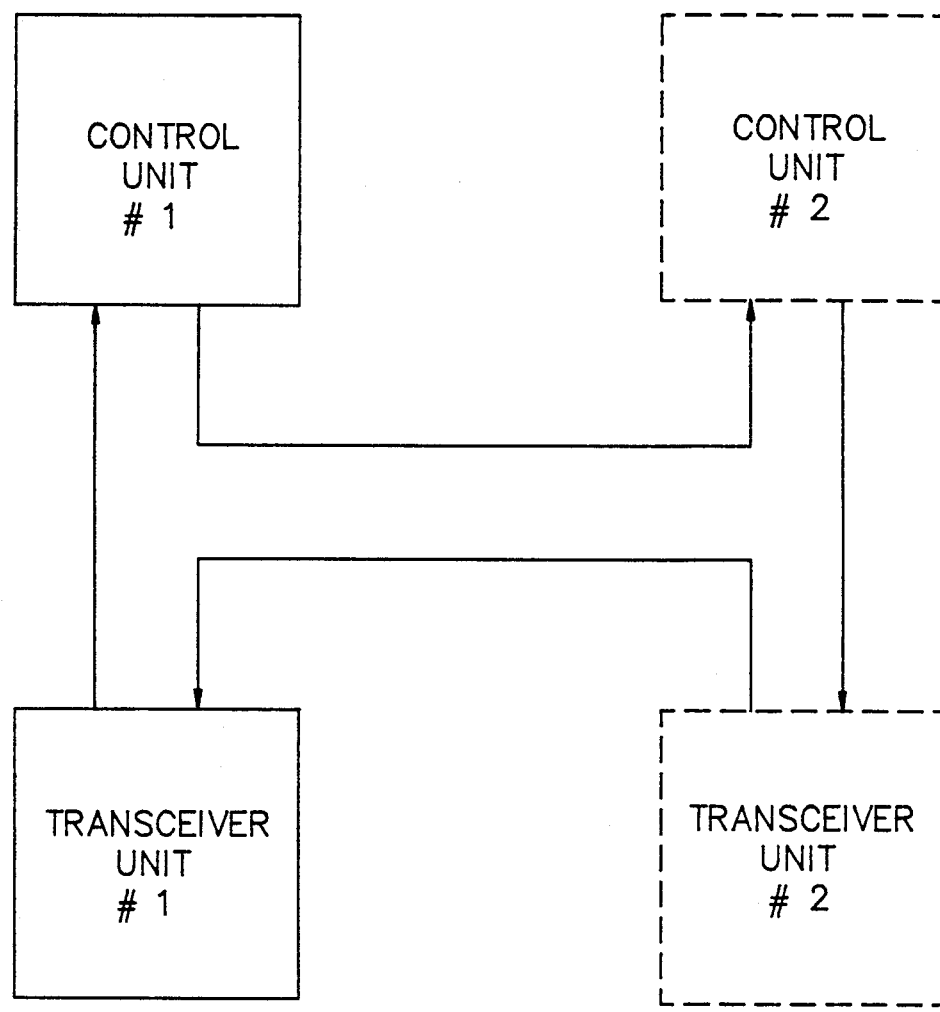
FIG. 14 is an illustration of a multiple Control Unit multiple Transceiver Unit serial interface system communication medium connection chart.

FIG. 14 relates to multiple unit interconnections. Multiple Control Units and multiple Transceiver Units may be connected together in various combinations.

In order to perform such operations, a network philosophy need be adopted. In one embodiment of this invention, the spirit of IEEE Standard 802.5, which is a form of token passing, is adopted. The units are physically connected in a ring or loop. Packages of information called frames are transmitted around the ring from source to destination in one direction only.

Referring again to FIG. 14, an example of using two Control Units and two Transceiver Units is illustrated. Obviously, one could have four Control Units and Four Transceiver Units, or ad infinitum. In order to operate such an interconnection network, the frame transmitted must contain the source address, the destination address and a frame-acknowledged field. In the system of the preferred embodiment, frame bits 20-21 can be the source field and 22-23 the destination field and bit 7 of the Command Channel can be the frame-acknowledged field. One unit on the ring is designated as the ring master. In the preferred embodiment, this would be Control Unit No. 1. The ring master transmits the first frame to a destination (Transceiver or Control Unit). As the frame enters each unit on the ring, the destination address field is checked for a match. When the destination address field matches the destination, when received, then the frame is accepted by the destination unit. The destination unit then retransmits the same frame with the frame-acknowledged field set=1 to let the originating source unit know that the destination unit did receive a valid frame. The source unit then increments the source address field by one, resets the frame-acknowledged field and sends the frame to the next unit on the ring to enable and cause the next source unit to transmit a frame. In the preferred embodiment, digitized audio samples are constantly being produced and thus, for clarity, each source will always have a destination to send a frame to, even if default destinations are used.

This method ensures that every unit attached to the ring communicates on the "token ring" bus regularity. This is vital to maintaining constant appearing audio response due to the method of transmitting digitized audio in the invention. Thus, frames (containing digitized audio) must be transmitted at a constant frequency rate. Thus the need for such a token ring bus communication system to be synchronous and periodic.

Figure 15:
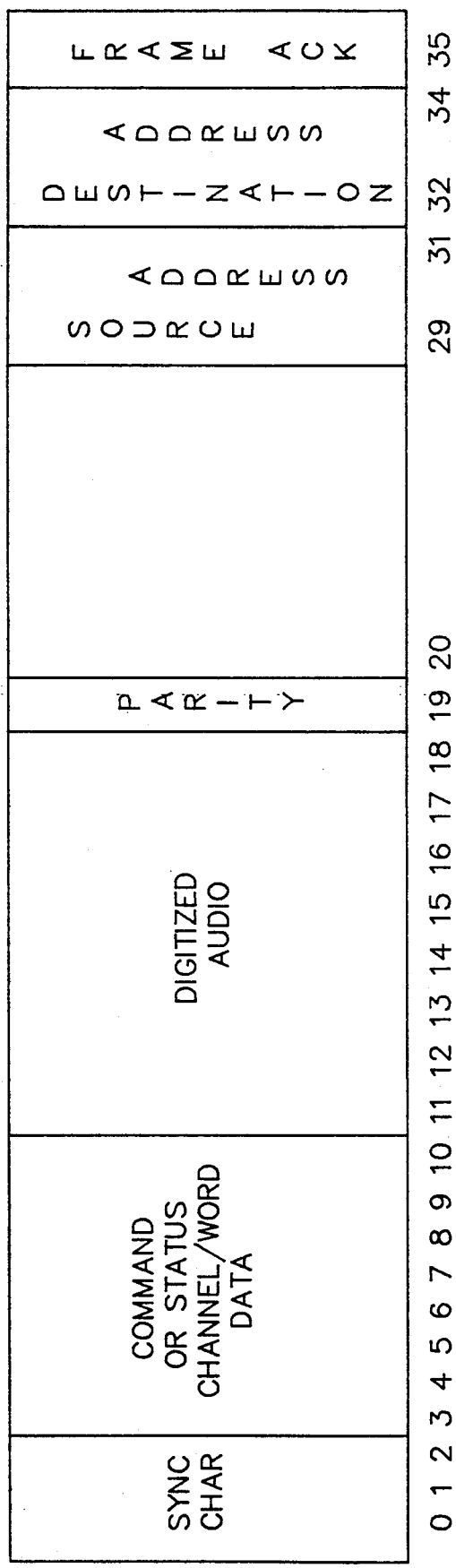
FIG. 15 shows a format suitable to enable a network handling multiple Control Units and multiple Transceiver Units using token passing principles.

A frame for the invention having capability for token-ring purposes is shown in FIG. 15.

Figure 16:
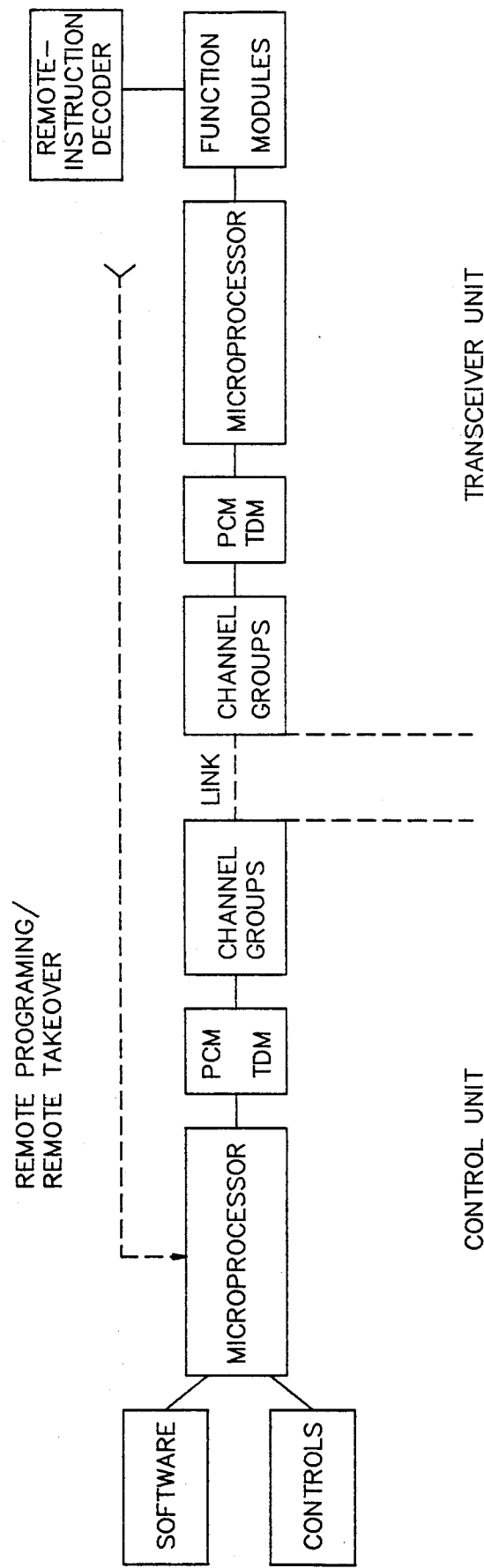
FIG. 16 shows the use of the invention to handle remote instruction decoding.

For the system in shown in FIG. 14, obviously only a two bit source address and a two bit destination address would be needed. The combinations might include:

One Control Unit to one Transceiver Unit
One Control Unit to two Transceiver Units
Two Control Units to one Transceiver
Two Transceivers to two Control Units These configurations are connected as per digital serial interface with additional microprocessor-based software. The Manchester encoder/decoders are made to be token ring compatible. FIG. 16 illustrates an embodiment of the Digital Serial Interface System in which a Remote Instruction Decoder is enjoined with the Function Modules of the Transceiver Unit. This provides a means of remote programming and remote takeover of the communications equipment through the Interface System.

The remote instructions are decoded in the Remote Instruction Decoder and are conveyed as data through the Serial Bus of the Interface System to the Control Unit. The data arriving at the Control Unit essentially simulates the control and programming protocols of the communications equipment. Data relating to programming are used to affect program changes, while data related to controls produce the desired control. A two-way flow of data is used over the Interface Bus as required. The remote instruction protocols may consist of sequential tones, DTMF signals, FSK or the like. Such signalling encoders and their respective decoders are commonly available from many suppliers in the signalling business. The unique properties of the invention, when incorporated in two-way radios, allow the use of such powerful capabilities without requiring alterations in the linking approach between the Control and Transceiver Units.

This embodiment empowers the headquaters of a two-way communications network to essentially remotely program outstations or mobile radios and take over their operation in part or entirely as required.

If not apparent, the advantages are overwhelming! For example, for special operations of a temporary nature, a public safety user can remotely be provided with a special set of new channels, tones, etc., for a limited time. This will allow the participation of that user in a special network, such as when a president's entourage is visiting, or where there is a special situation requiring collaboration between otherwise independent services. The possibilities are limitless. As another example, if a police car is stolen, headquarters can render its communications equipment useless through remotely instructing the radio to "dump" its memory.

In another example, an officer outside a patrol vehicle may have the squelch of the police transceiver set to restrict weak signals. This would normally make it impossible for headquarters to access that vehicle or officer through the radio. However, using the Remote Takeover System of this embodiment, headquarters can remotely "loosen" the squelch (allow radio to receive less strong signals), then remotely turn on the transceivers's public address system to call the officer to the vehicle.

In yet another example, the headquarters may assist a vehicle outside its normal route to communicate through a special repeater site by remotely taking over the control of the mobile radio and activating special CTCSS tones available for that site. This whole remote takeover approach can be advantageously used in multi-regional/multiservice networks where, conventionally, the user has to refer to complex charts to set tones, channels, etc. This becomes especially difficult for a public safety officer chasing a car at 90 mph! In such situations, the headquarters can remotely take over all the settings, allowing the vehicle operator to concentrate on other tasks.

Figure 17:
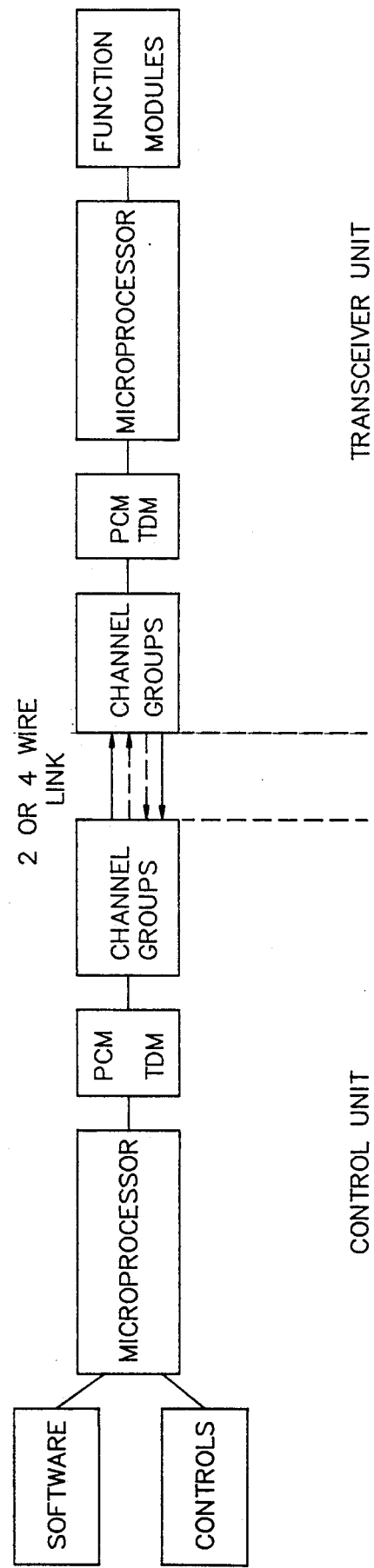
FIG. 17 shows the use of the invention with either a two or four wire communications medium link.

FIG. 17 illustrates the Digital Serial Interface System with a full duplex unipolar (single ended) 2-wire transmission link physically connecting the Control Unit and the Transceiver Unit of a two-way land/mobile radio or other communications equipment. For specially longer distances or noisy environments, the Interface System can utilize a 4-wire full duplex bipolar (differential/mode) transmission link.

This embodiment demonstrates another major advantage of the system of the invention. As mentioned, the control cables of any sophisticated communications equipment, such as a high-end land/mobile radio, tend typically to be bulky and complex. The conventional multiconductor control cables are expensive to manufacture and expensive to terminate with multipin connectors at both ends. Furthermore, multipin matching connectors are required at both the Control Unit and the Transceiver. Hand soldering multiconductor control cables to multipin connectors takes time and is prone to errors, shorts, cold solder joints and future problems through bending of pins. The bending occurs during mating and disconnecting in tight quarters or through heavy objects placed on top of the communications equipment such as in the trunk of an automobile. Such connectors are even sometimes referred to as the 'Achilles' Heel' of the communications equipment.

If, on the other hand, automated soldering is used, it requires larger original capital investments and limits the flexibility of the equipment due to the mass-production uniformity of the wiring.

The Interface System of the invention obviates the above problems and others such as the difficulty of passing and bending of thick multiconductor cables under vehicle carpets. Using the system of the invention, a simple, inexpensive and compact 2 or 4-wire conductor cable may be used with simple plugs. Actually, the use of this invention in a modern two-way radio has even allowed the utilization of a simple, phone connector cable with modular plugs at each end. No rewiring for versatility is required, because the versatility is in the Interface System and the Software. In fact, with the simple phone cable mentioned, the communications equipment would be capable of significantly higher versatility compared to thick, limited and problematic conventional control cables.

Figure 18:
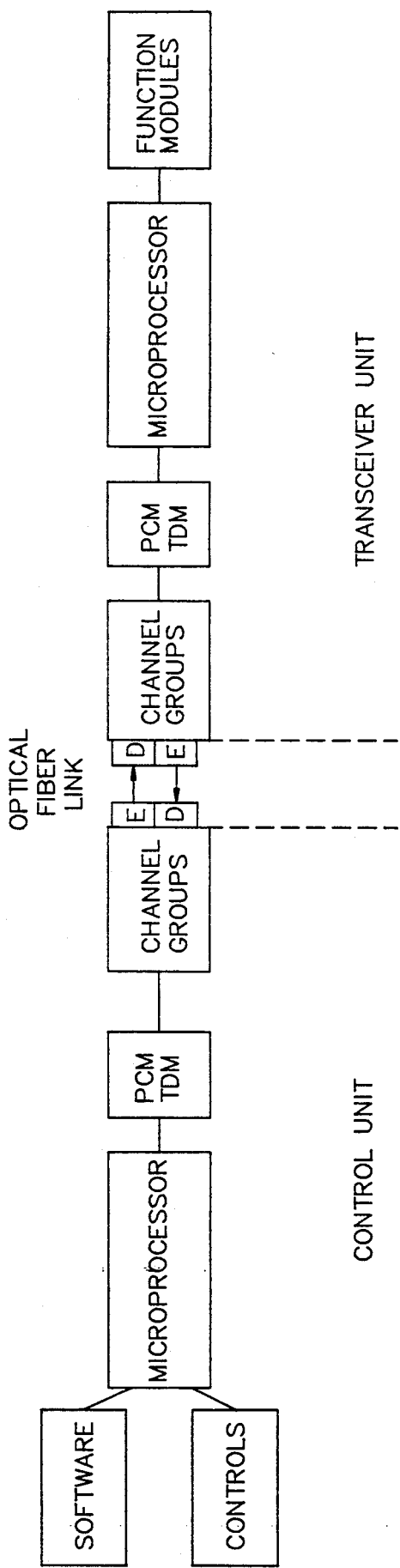
FIG. 18 shows the application of optical fiber as the communications medium.

FIG. 18 illustrates another embodiment of the invention in which the Control Unit and Transceiver Unit of a two-way land/mobile radio or other communications equipment are physically connected through a 2 "conductor" optical fiber full duplex transmission linking medium.

Encoders and Decoders at the Control Unit and Transceiver Unit connection points transmit and receive the coded light beams for utilization/processing by the Interface System.

This embodiment has all the applicable advantages of the embodiment described in FIG. 17. In addition, however, it provides other advantages such as: further compactness, freedom from corrosion (to which metallic conductors are prone), freedom from noise pickup in high noise areas—such as in automobiles, freedom from problems of emissions from the control link, freedom from R. F. manifestations due to mutual inductance/capacitance at VHF, UHF and SHF frequencies and immunity from crosstalk problems between conductors.

Figure 19:
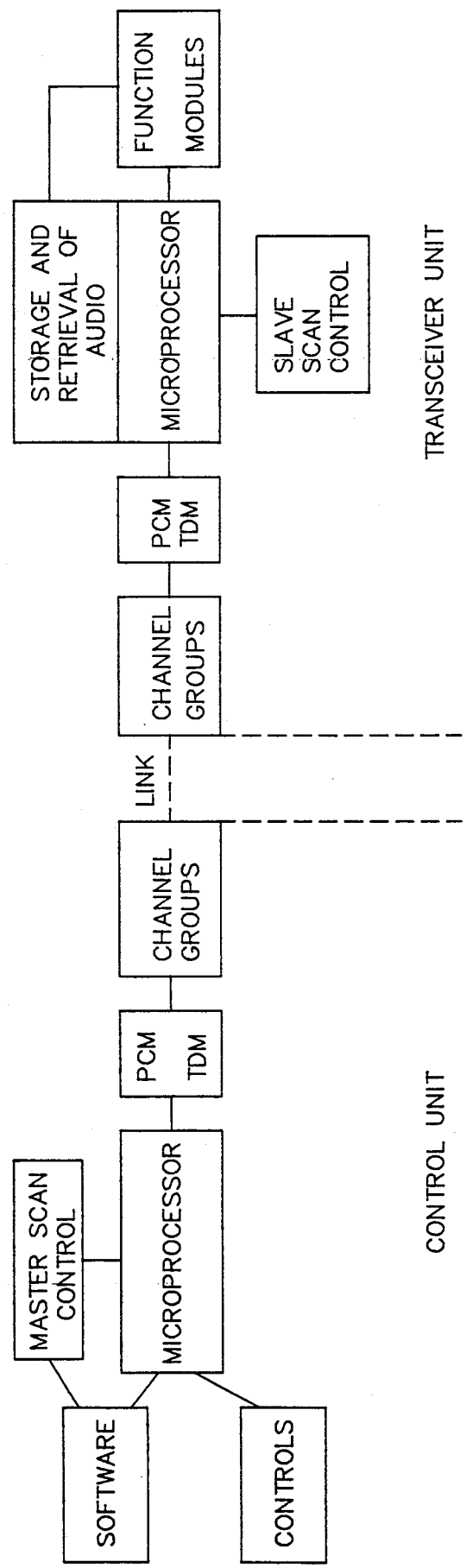
FIG. 19 shows the connection of Transceiver Unit function modules with a Control Unit master scan control program and a transceiver unit slave scan control program.

FIG. 19 illustrates another embodiment of the invention in which the microprocessor and other elements of the Interface System essentially store and retrieve audio for various types of processes. Such an arrangement can, for example, be used to eliminate "popping" sounds during scan.

Figure 20:
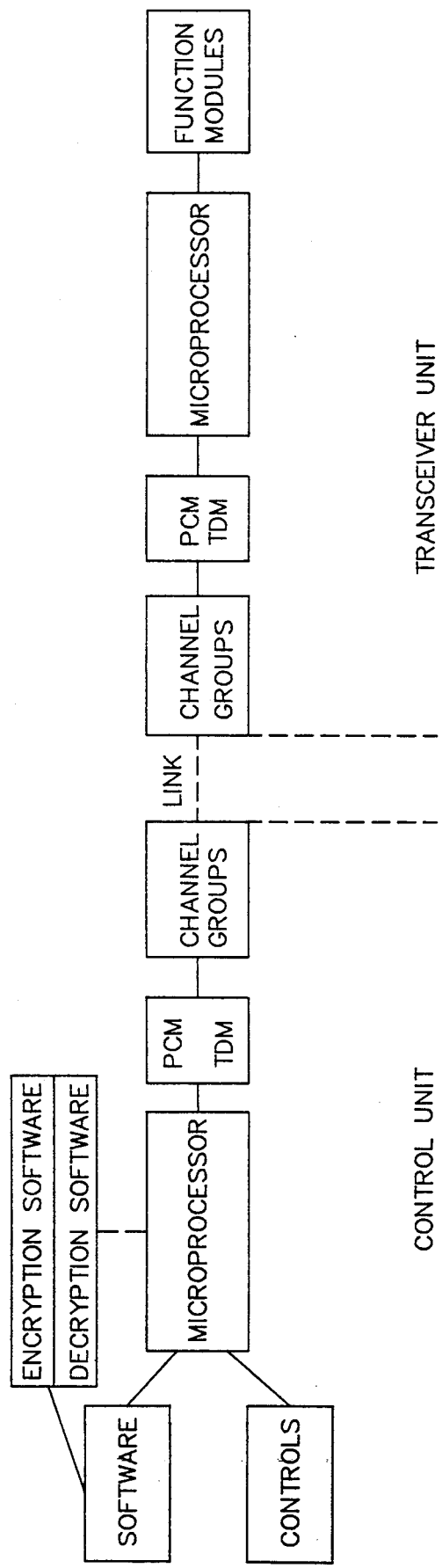
FIG. 20 shows the use of microprocessor/encryption/decryption software.

FIG. 20 illustrates another embodiment of the invention in which the digital data stream produced by the Interface System is manipulated through various means, such as algorithms, to produce encryption/decryption. The Interface System elements are inherently conducive to such encryption/decryption schemes because the system already generates digitized audio which is anyway under software control. Since the microprocessor that would be used for the system of the invention automatically provides memory, storage, retrieval, software control, etc., all the elements for producing encryption/decryption would be available. Adding to this are the types of linking mediums between the Control Units and Transceiver Units described herein which are already designed to accommodate digitized and coded audio or digital data. Thus, any 'jumbling' and manipulation of the digital data stream through software algorithms and other means would essentially produce the encryption. At the receiving end, the process would be reversed to produce decryption. Multiple levels or types of encryption can be used through multiple schemes of manipulations or combinations of the schemes with other encryption systems.

The advantages derived are tremendous, with the most significant being the cost-savings. Any communications equipment designed with the Interface System of this invention would already have resident elements that would lend themselves to various encryption/decryption schemes. This is an important savings as voice/data security options or capabilities account for a significant part of the price of modern communications networks where encryption/decryption is a requirement.

Figure 21:
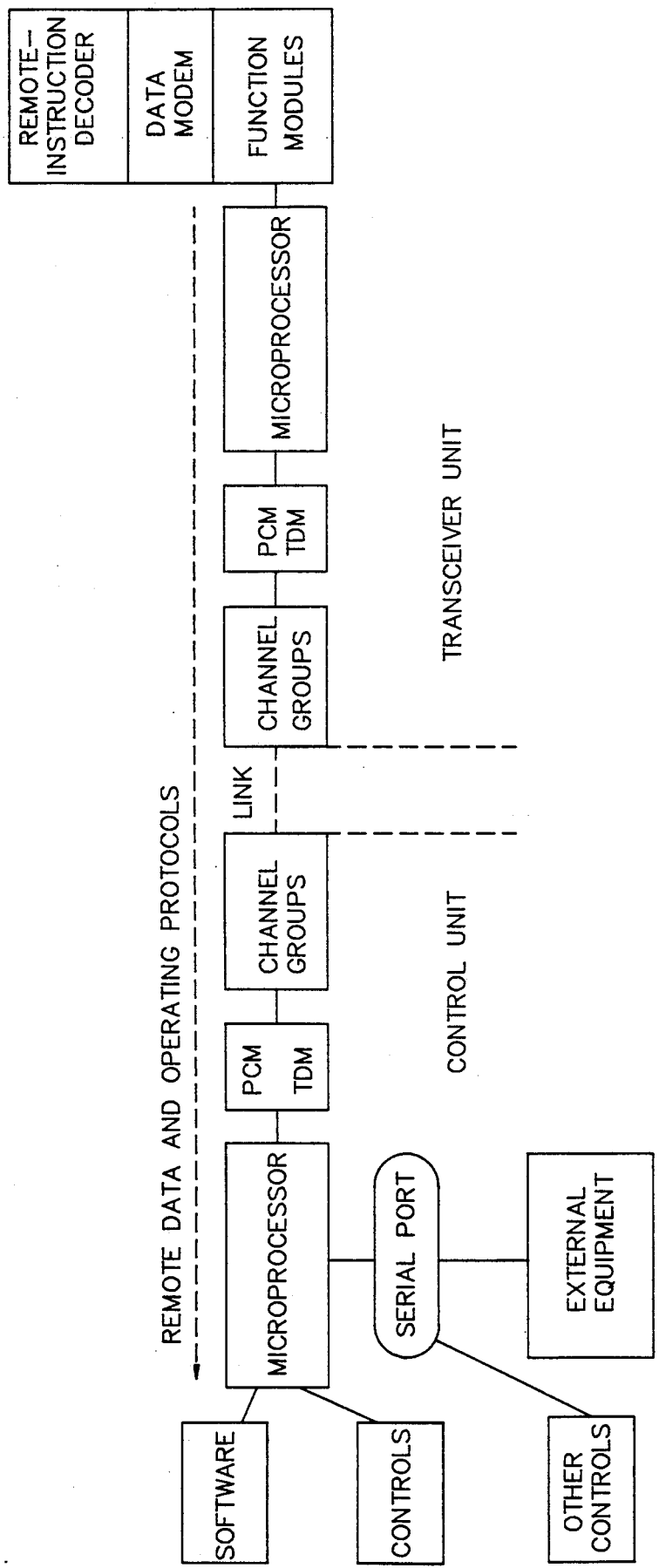
FIG. 21 shows a Remote Instruction Decoder with modem associated with a transceiver.

FIG. 21 illustrates another embodiment of the invention whereby external data-related equipment connected to the Control Unit of the communications equipment receive data and operating protocols through the Serial Interface System.

A Remote Instruction Decoder and Data Modem combined (or connected) to the Function Modules of the Transceiver Unit route the data and operating protocols through the Serial Interface System to the Control Unit's Serial RS232C Interface Port which provides 2-way access into the Serial Interface System. The operating protocols control the external devices and the data received is used for a predetermined task.

This embodiment of the invention can provide many new and advantageous uses of communications equipment. For example, a special graphics printer connected to the Serial Port of the Control Unit of a mobile trunk mount Transceiver Unit can allow a public safety officer to receive pictures of a suspect right in the patrol vehicle. Similarly, in land/mobile networks, the mobile radio equipment can receive formal, printed task assignments, or instructions, or plans displayed on a mobile data terminal. The applications are many. Another advantageous application, as an example, could be a remote control system. In this case, a Receiver Remote Instruction Decoder and Data Modem would route remotely transmitted data and operating protocols over the Serial Interface System to operate one or more external devices and also provide data to a supervisory system. The Receiver need not be co-located with the Control Unit. The actual linking medium of the Interface System could merely consist of a 2-wire (or optical fiber) compact cable.

This embodiment may be combined with that illustrated in FIG. 26, to be described later, to provide two-way communications, to and from the external devices connected to the Control Unit of communications equipment using the Interface System of this invention. The two-way system would allow remote transmission by a control station of data and operating protocols to the external devices connected to the communications equipment and also from these external devices back to the control station. Such a two-way arrangement may be used for sophisticated telemetry and remote control applications, such as monitoring the operation of remote pumping stations, providing computerized remote controls based on the feedback and the established software protocols, plus maintaining data files on the entire system.

The overall applications of this embodiment would be too numerous to mention. Some other systems that could use this embodiment include remote traffic control systems, remote security control systems, mobile command and control systems and remote control of special, unmanned vehicles.

Figure 22:
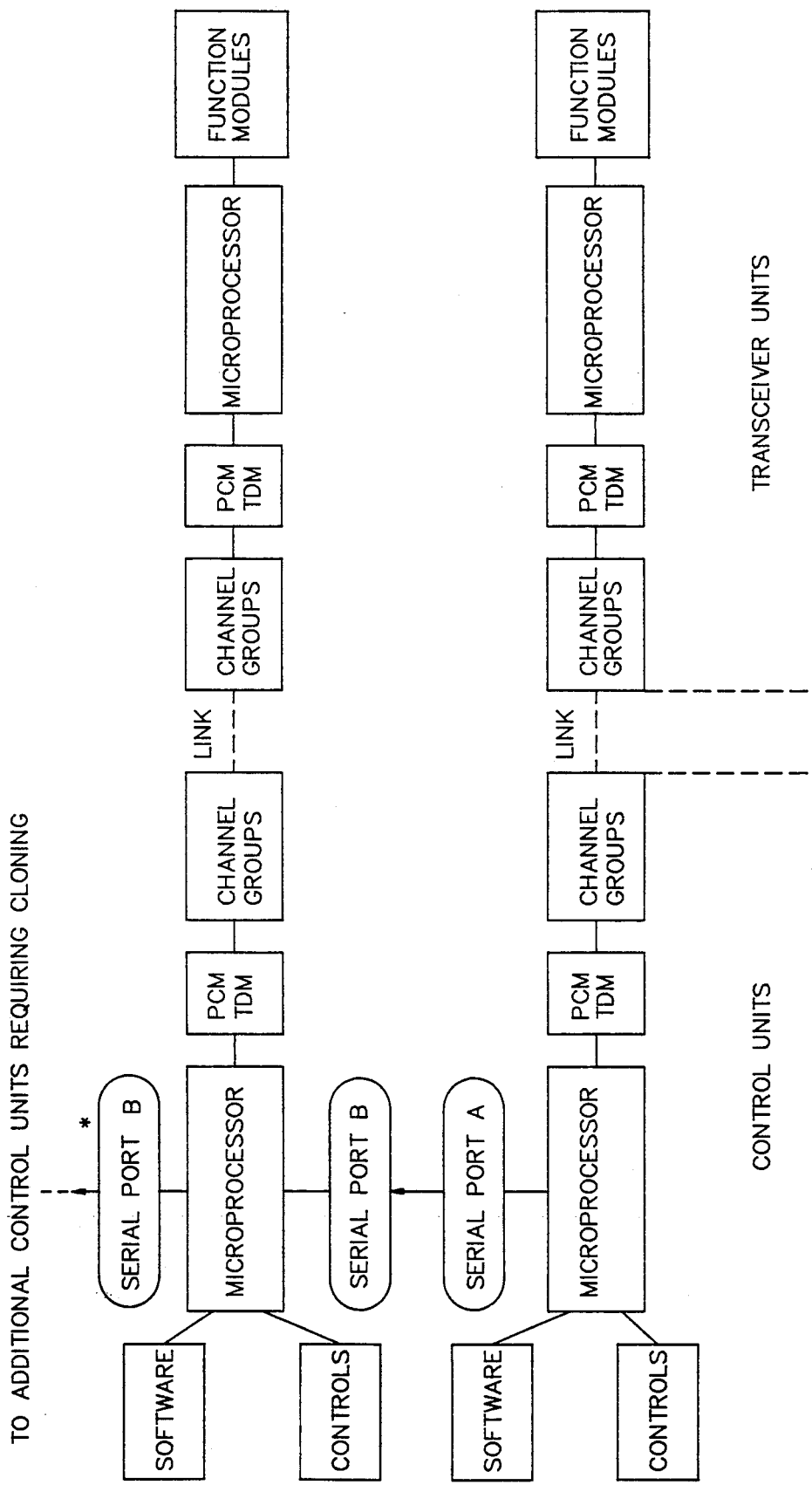
FIG. 22 illustrates the use of serial RS232C interface ports used for cloning programs between radio equipment.

FIG. 22 illustrates the serial port to serial port connection of two radio equipment using the novel Serial Interface System of this invention. The RS232C interface ports shown provide direct 2-way access to the Serial Interface System of the equipment.

Cloning of programs can, therefore, be achieved between the two radio equipment, controlled by predetermined software recognized commands. The RS232C interface posts may also be used.

Figure 23:
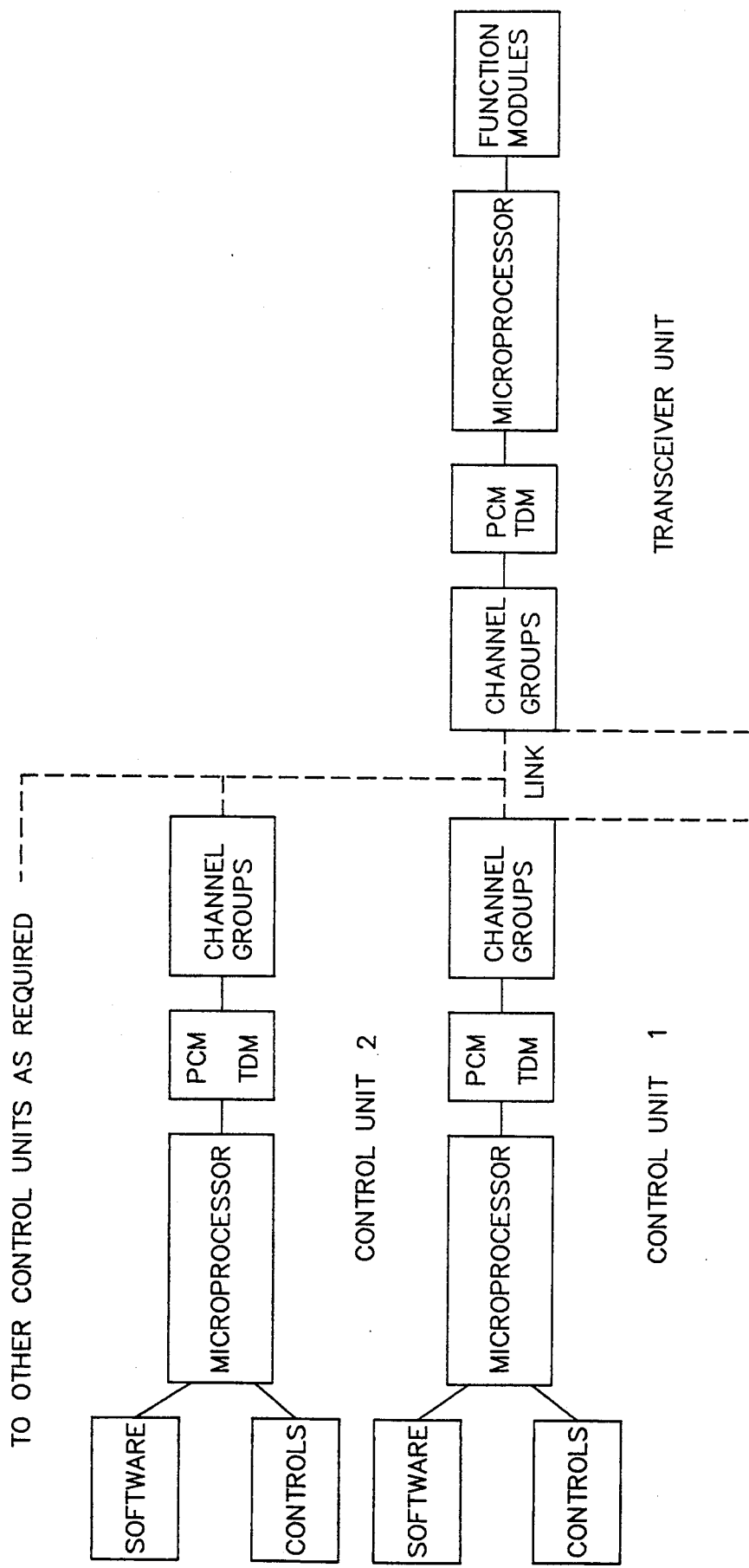
FIG. 23 shows the use of a serial interface network, showing a multiple Control Unit single Transceiver configuration.

FIG. 23 illustrates another embodiment of the invention. Two or more Control Units at multiple locations may be used to operate one Transceiver Unit. The inherent nature of the Serial Interface System would allow this if the data formats and coding systems of the equipment are consistent as, for example, the use of 'token passing' discussed above. The linking medium would be simple as the actual physical connections are with two (or four) wire conductors or two optical fibers. The few special provisions enabling such operation are well worth it, as many advantages are derived. For example, a mobile transceiver in a large vehicle may be operated from multiple positions. In fixed station applications, base stations may be operated from several control positions in a building or headquarters complex and would require only simple, compact cabling due to the use of the Serial Interface System.

Figure 24:
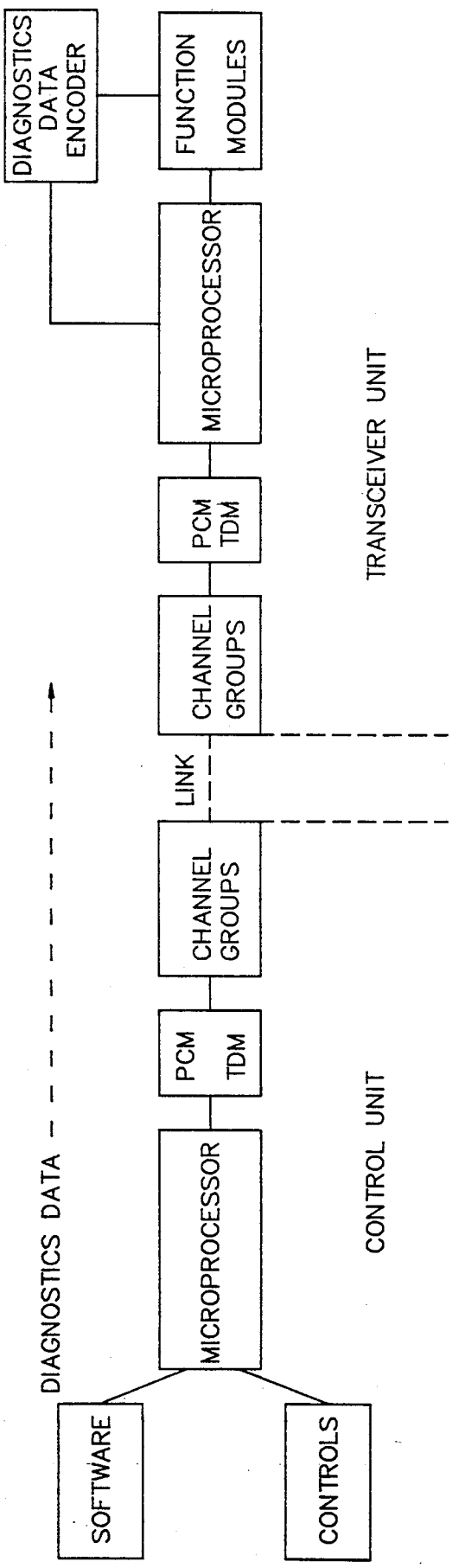
FIG. 24 shows the use of autodiagnostics operating over the Digital Serial Interface system of the invention.

FIG. 24 is another embodiment of the invention in which diagnostics data is routed from the Control Unit of a communications equipment, through the Serial Interface System, to the Transceiver Unit. A Data Encoder connected to the Microprocessor and Function Modules of the Transceiver Unit is used to encode and transmit the diagnostics data.

This embodiment would have many applications in the communications domain in microprocessor based equipment. For example, in a modern two-way land-/mobile microprocessor-enhanced radio, diagnostic data could be routed through the Interface System and stored or displayed (or both) in the Control Unit. The software may also stipulate that upon development of any diagnostic findings, the related data would be routed through the Interface System, encoded and transmitted during each subsequent transmission or automatically. One method of automatic transmission could be to stipulate in software that upon development of faults, a tone sequence, such as one or more ZVEI status tones, may be transmitted. This would indicate the problems to the parties concerned.

The advantages are many. For example, in a two-way land/mobile network, headquarters would automatically be notified of a problem in a mobile radio, even if the operator is outside the vehicle. This would allow appropriate remedies to take place. Another example for the same type of radio would be an indication to headquarters of a low battery condition, even if the vehicle is parked overnight.

This embodiment may be combined with the embodiment of FIG. 16 to also allow headquarters to access a remotely located communications equipment to obtain the compilation of the problems stored in its memory. The headquarters may then use the system of FIG. 16 to enact compensatory programming or operational tactics such as alerting the operator of the problem.

Figure 25:
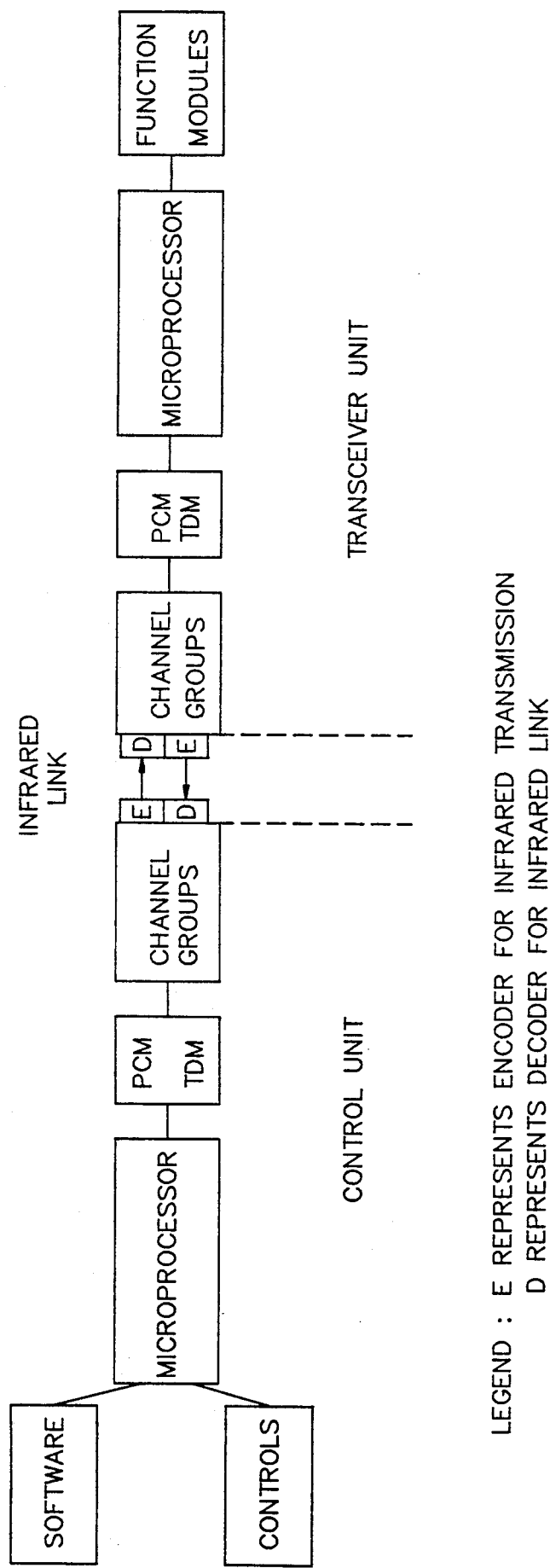
FIG. 25 merely shows that an infrared device can communicate with a Control Unit.

FIG. 25 illustrates another embodiment using the Serial Interface System in which an infrared link is used between the Control and Transceiver Units. It operates essentially in the same manner as an optical fiber linking medium, but utilizes the infrared spectrum and does not need optical fiber or wire linking mediums. A simpler version of the Control Unit may also be used using the same medium to access the control system of the radio equipment.

Figure 26:
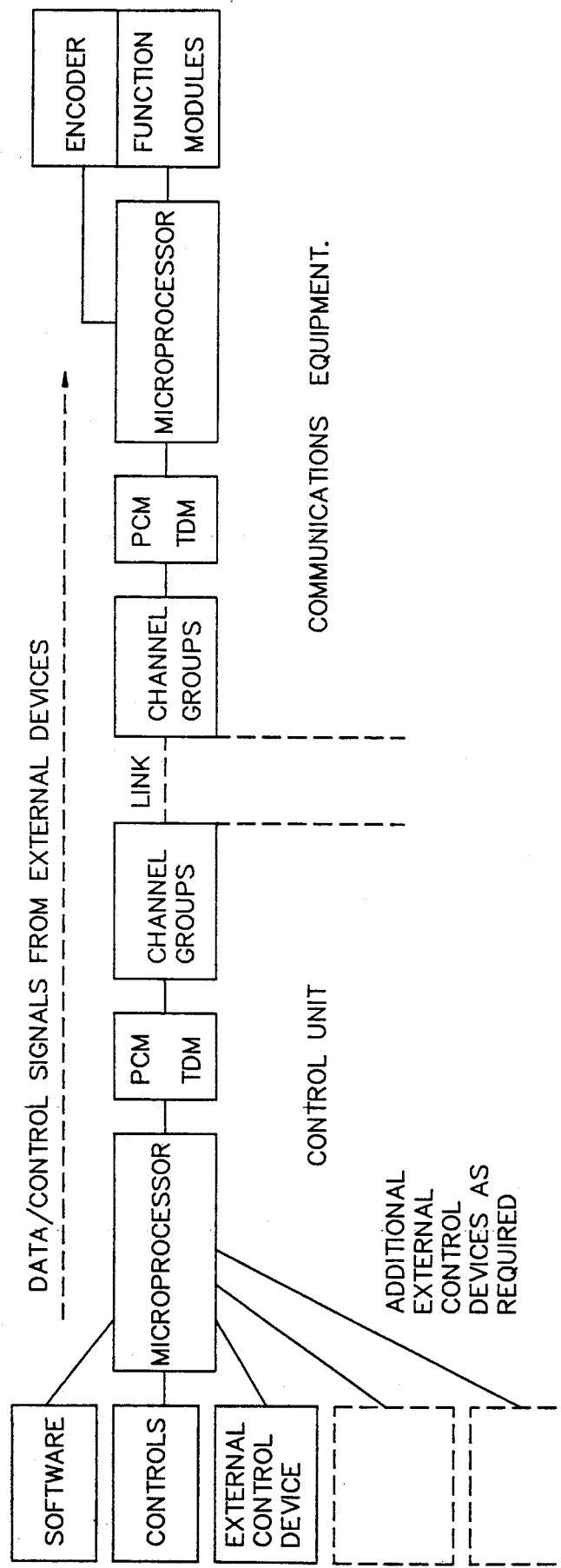
FIG. 26 shows that control operations can control external devices when specific command messages are transmitted from the Control Unit over the Serial Interface System.

FIG. 26 illustrates yet another embodiment of the invention in which one or more external control devices route data and control signals through the Interface System to the Transceiver Unit. The data and control signals are then encoded and transmitted.

This embodiment allows microprocessor-based communications equipment to advantageously transmit copious data and control signals from peripheral or external devices. Telemetry networks where many parameters have to be monitored and reported would be one beneficiary of this embodiment.

The Interface System would allow a variety and large amounts of data and control signals to be organized, coded and routed through the link medium (which may consist of an optical fiber) and then encoded and transmitted through equipment such as suitable two-way land/mobile radios.

The different embodiments of the invention, as illustrated above, can be advantageously combined to obtain multiple capabilities. The preferred embodiment coding and formatting may be used in all the other embodiments or combinations thereof. The applications of the embodiments herein presented are not limited to those used to illustrate the advantages of the embodiments. In fact, the applications and capabilities produced by the combinations or derivatives of the invention are only limited by the imagination of the equipment, software or system designer, without departing from the spirit of the invention.

The Serial Interface System is so versatile that many natural derivatives and embodiments can be realized through the disclosure of the embodiments of the invention herein presented. All such derivatives and modifications as may be made by those skilled in the art are, therefore, considered within the scope of the invention.

What is claimed is:

1. A digital serial communications link comprising:
   (a) a first time division multiplexed full duplex digital interface for a two-way radio having a means for transmitting and receiving time-division multiplexed pulse code modulation signals;
   (b) a second time division multiplexed full duplex digital interface for a two-way radio having a means for transmitting and receiving time-division multiplexed pulse code modulation signals; and
   (c) a bidirectional time division multiplexed full duplex communicating medium connecting said first time division multiplexed full duplex digital interface with said second time division multiplexed full duplex digital interface.

2. The digital serial communicating link of claim 1 further comprising a means for storing and retrieving digital signals connected to said first time division multiplexed full duplex digital interface.

3. The digital serial communication link of claim 1 wherein said pulse code modulation signals are transmitted and received by Manchester II (biphase-L) format.

4. The digital serial communication link of claims 1 or 3 wherein said time-division multiplexed pulse code modulation signals are command or status signals and digitized audio.

5. The digital serial communication link of claim 1 or 3 wherein said first and second time division multiplexed full duplex digital interface provide means for serializing and deserializing said signals.

6. The digital serial communication link of claim 5 wherein said means for serializing and deserializing signals is a time-division multiplexor/demultiplexor.

7. The digital serial communication link of claim 1 wherein said bidirectional time division multiplexed full duplex communicating medium is a two or four path link.

8. The digital serial communication link of claim 7 wherein said bidirectional time division multiplexed full duplex communicating medium is infrared.

9. The digital serial communication link of claim 7 wherein said bidirectional time division multiplexed full duplex communicating medium is an optical fiber.

10. The digital serial communication link of claim 9 wherein said means for transmitting and receiving time division multiplexed pulse code modulation signals is a Manchester II encoder/decoder.

11. A digital communication link comprising:
(a) a first time division multiplexed full duplex digital interface for a two-way radio including means for serializing and deserializing signals including digitized audio;
(b) a second time division multiplexed full duplex digital interface for a two-way radio including means for serializing and deserializing signals including digitized audio, and;
(c) a synchronous bidirectional time division multiplexed full duplex communicating medium connecting said first time division multiplexed full duplex digital interface with said second time division multiplexed full duplex digital interface.

12. The digital communication link of claim 11 wherein said synchronous bidirectional time division multiplexed full duplex communicating medium is a two or four path link.

13. The digital communication link of claim 12 wherein said synchronous bidirectional time division multiplexed full duplex communicating medium is infrared.

14. The digital communication link of claim 12 wherein said synchronous bidirectional time division multiplexed full duplex communication medium is an optical fiber.

15. The digital communication link of claim 11 further comprising a means connected to said first time division multiplexed full duplex digital interface for storing and retrieving digitized signals.

16. The digital communication link of claim 15 wherein said means for storing and retrieving digitized signals includes storing and retrieving digitized audio.

17. The digital communication link of claim 11 wherein said means for serializing and deserializing signals is a time-division multiplexor/demultiplexor.

18. The digital communication link of claim 11 or 17 wherein the transmission and reception of signals between said first time division multiplexed full duplex digital interface and said second time division multiplexed full duplex digital interface is provided by a pulse code modulator/demodulator.

19. The digital communication link of claim 18, wherein said pulse code modulation signals are transmitted and formatted by Manchester II (biphase-L) format.

20. A Digital Serial Interface System comprising:
(a) a controller for a two-way radio;
(b) a radio frequency unit for a two-way radio;
(c) a time division multiplexed full duplex linking medium providing serial two-way communications for digital signals and digitized audio between said controller and said radio frequency unit;
(d) a first means for serializing and deserializing digital signals and digitized audio by time division multiplexing and pulse code modulation connected to said controller side of said full duplex linking medium; and
(e) a second means for serializing and deserializing digital signals and digitized audio by time division multiplexing and pulse code modulation connected to said radio frequency unit side of said time division multiplexed full duplex linking medium.

21. The Digital Serial Interface System of claim 20 wherein said first means and said second means for serializing and deserializing digital signals and digitized audio are operatively connected to said controller and said radio frequency unit.

22. The Digital Serial Interface System of claim 21 wherein said linking medium is a two or four path link.

23. The Digital Serial Interface System of claim 21 wherein said means for serializing and deserializing digital signals and digitized audio is a time-division multiplexor/demultiplexor.

24. The Digital Serial Interface System of claim 23 further comprising a first pulse code modulator/demodulator disposed on one end of said full duplex linking medium and a second pulse code modulator/demodulator disposed on the other end of said full duplex linking medium.

25. The Digital Serial Interface System of claim 23 wherein transmission and reception of digital signals and digitized audio between said controller and said radio frequency unit is accomplished by pulse code modulation and demodulation.

26. The Digital Serial Interface System of claim 25 wherein said pulse code modulation signals are transmitted and formatted by Manchester II (biphase-L) format.

27. A Digital Serial Interface System between a Control Unit and a Transceiver Unit of a two-way radio, said interface comprising:
(a) a linking medium;
(b) two interface blocks;
(c) one of said interface blocks associated with said Control Unit;
(d) one of said interface blocks associated with said Transceiver Unit;
(1) said interface block comprising:
(i) a digital controller;
(ii) a first digital input port for receiving a command channel word, said port having an input and an output;
(iii) a second digital port for receiving a status channel word, each said port having an input and an output;
(iv) a first command/status data switch, said switch having a first input, a second input and an output of said first input connected to said output of said first digital input port, said second input connected to said output of said second digital input port, said switch being set by said controller to whether a command channel word or a status channel word is to be transmitted in a frame being assembled;

(v) a first parallel to serial shift register, said register having an input and an output, said input connected to said output of said command/status data switch, said register loading said command channel word or said status channel word, as determined by said switch, into said register as ordered by said controller;

(vi) an audio analog-to-digital converter, said converter having an input and an output, said input receiving analog audio, said converter sampling said analog audio and providing a digital audio data word representing said sample, said digitized audio word being available at said converter's output;

(vii) an audio serial-to-parallel shift register, said register having an input and an output, said digital controller moving said digitized audio word into said serial-to-parallel shift register upon completion of formation of said digitized audio word;

(viii) a second parallel-to-serial shift register, said register having a first input, a second input, and an output, said controller loading said digitized audio word from said audio serial-to-parallel shift register to said input of said second parallel-to-serial shift register.

(ix) a frame-former/Manchester encoder having an input and an output, said controller upon recognition that both said first parallel-to-serial shift register and said second parallel-to-serial shift register have been loaded loads both: (1) said digitized audio word from said second parallel-to-serial shift register and (2) said channel word from said first parallel-to-serial shift register in serial form into said input of said frame-former/Manchester encoder, said, encoder forming the digital being assembled, said frame including said digitized audio word, said channel word, and a synch character, said encoder transmitting said assembled formed frame serially at said output of said encoder in biphase-L Manchester-II electrical format, said transmissions being synchronous;

(x) a transmitting line driver, said driver amplifying said output of said encoder to a level and electromagnetic spectrum frequency range suitable for transmission on said medium;

(xi) a line receiver, said receiver having an input and an output, said input connected to said medium, said receiver stripping noise from a biphase-L Manchester-2 signal received at said input from said medium, said receiver providing a data stream signal at a suitable level and electromagnetic spectrum frequency range at said output of said receiver;

(xii) a Manchester decoder having an input and an output, said decoder determining a Receive Clock signal from said data stream signal, said decoder determining whether a received frame is valid and thus containing (1) a received status channel word or received command channel word and (2) a digitized audio word in said received valid frame, said decoder transforming said suitable level suitable electromagnetic spectrum frequency range biphase-L Manchester II received signal at said input of said decoder into a suitable electrical form signal at said output of said decoder, said form signal containing said received digitized audio word and said received channel work;

(xiii) a first Receiver Serial-to-Parallel Shift Register, said register having an input and an output, said input connected to said output of said decoder, said register receiving and storing said received digitized audio word from said decoder, said controller causing such receipt and storage upon recognition that a valid frame has been received by said decoder;

(xiv) a second Receiver Serial-to-Parallel Shift Register, said register having an input and an output, said input connected to said output of said decoder, said register receiving and storing said receiver channel word from said decoder, said controller causing such receipt and storage upon recognition that a valid frame has been received by said decoder;

(xv) a Receiver command/status data switch, said decoder setting said switch to match whether said command channel word or said status channel word has been received at said decoder, saiu setting taking place upon receipt of said valid frame at said decoder;

(xvi) an Audio Parallel-to-Serial Shift Register, said register having an input and an output, said input connected to said output of said first Receiving Serial-to-Parallel Shift Register, said controller transferring the stored contents of said first Receiver Serial-to-Parallel Shift Register to said Audio Parallel-to-Serial Shift Register upon completion of receipt of all bits of said received digitized audio word to said First Receiver Serial-to-Parallel Shift Register;

(xvii) an Audio Digital-to-Analog Converter, said converter having an input and an output, said input connected to said output of said Audio Parallel to Serial Shift Register, said converter converting said received digitized audio word to an analog output, said controller causing said conversion to occur when said Audio Parallel-to-Serial Shift Register has received said received digitized audio word;

(xviii) a receiver command port, said port having an input and an output;

(xix) a receiver status port, said port having an input and an output, said receiver command port receiving and storing the stored contents of said Second Receiver Serial-to-Parallel Shift Register if said Receiver Command/Status data switch indicates a received command channel word, said receiver status port receiving and storing the stored contents of said Second Receiver Serial-to-Parallel Shift Register if said Receiver Command/Status Data Switch indicates a received status channel word, said controller causing such receipt at the appropriate command or status port upon completion of receipt of said received channel word at said Second Receiver Serial-to-Parallel Shift Register.

28. The invention of claim 27 wherein said pulse code modulation technique is Manchester II (biphase-L).

29. The invention of claim 27 wherein said communications linking medium is optical fiber.

* * * * *